(12) United States Patent
Lee et al.

(10) Patent No.: US 10,885,609 B2
(45) Date of Patent: Jan. 5, 2021

(54) ELECTRONIC DEVICE FOR PROCESSING IMAGE BASED ON PRIORITY AND METHOD FOR OPERATING THEREOF

(71) Applicant: Samsung Electronics Co., Ltd., Gyeonggi-do (KR)

(72) Inventors: Yongju Lee, Gyeonggi-do (KR); Jae Gon Kim, Gyeonggi-do (KR); Na-Ri Im, Gyeonggi-do (KR); Mincheol Hwang, Seoul (KR); Ji-Yoon Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/180,730

(22) Filed: Nov. 5, 2018

(65) Prior Publication Data

US 2019/0139195 A1    May 9, 2019

(30) Foreign Application Priority Data

Nov. 3, 2017    (KR) ......................... 10-2017-0145999

(51) Int. Cl.
*G06T 5/00* (2006.01)
*H04N 5/232* (2006.01)
(Continued)

(52) U.S. Cl.
CPC .......... *G06T 5/001* (2013.01); *G06K 9/00664* (2013.01); *G06T 7/11* (2017.01);
(Continued)

(58) Field of Classification Search
CPC ....... G06T 5/001; G06T 7/11; G06K 9/00664; H04N 5/23293; H04N 5/23235;
(Continued)

(56) References Cited

U.S. PATENT DOCUMENTS 7,024,046 B2    4/2006    Dekel et al.
8,930,448 B2    1/2015    Doyle et al.
(Continued)

OTHER PUBLICATIONS

European Search Report dated Mar. 7, 2019 issued in counterpart application No. 18203989.1-1230, 10 pages.

*Primary Examiner* — Luong T Nguyen
(74) *Attorney, Agent, or Firm* — The Farrell Law Firm, P.C.

(57) ABSTRACT

An electronic device is provided that includes a camera, a communication module, a display, and a processor. The processor may be configured to acquire a raw image for one or more external objects by using the camera, recognize the one or more external objects by segmenting the raw image into a plurality of regions corresponding to the one or more external objects, determine a priority for at least a partial region among the plurality of regions based on at least one object of interest among the one or more external objects, transmit data corresponding to at least the partial region to an external electronic device according to the priority so that the external electronic device generates image processing information for at least the partial region, and display the raw image of which at least the partial region is sequentially corrected according to the priority, via the display by using the image processing information.

20 Claims, 17 Drawing Sheets

(51) Int. Cl.
*G06T 7/11* (2017.01)
*G06K 9/00* (2006.01)
*H04N 9/64* (2006.01)
*H04N 19/37* (2014.01)

(52) U.S. Cl.
CPC ..... *H04N 5/23235* (2013.01); *H04N 5/23293* (2013.01); *H04N 5/23203* (2013.01); *H04N 5/23245* (2013.01); *H04N 9/64* (2013.01); *H04N 19/37* (2014.11)

(58) Field of Classification Search
CPC ........... H04N 5/23203; H04N 5/23245; H04N 19/37; H04N 9/64
See application file for complete search history.

(56) References Cited

U.S. PATENT DOCUMENTS

| | | |
|---|---|---|
| 8,990,874 B2 | 3/2015 | Huang |
| 9,633,042 B2 * | 4/2017 | McKinnon .............. G06F 16/50 |
| 9,977,429 B2 * | 5/2018 | Lee ....................... B64C 39/024 |
| 10,244,177 B2 * | 3/2019 | Lee ..................... H04N 5/23216 |
| 2010/0309335 A1 * | 12/2010 | Brunner ................. H04N 5/265 |
| | | 348/231.6 |
| 2013/0188045 A1 | 7/2013 | Kalevo |
| 2014/0136686 A1 | 5/2014 | Tsai et al. |
| 2015/0350504 A1 | 12/2015 | Corcoran |
| 2016/0037085 A1 | 2/2016 | Mills et al. |
| 2017/0019604 A1 | 1/2017 | Kim et al. |
| 2017/0048461 A1 | 2/2017 | Lee et al. |
| 2017/0251330 A1 | 8/2017 | Won et al. |

\* cited by examiner

ELECTRONIC DEVICE FOR PROCESSING IMAGE BASED ON PRIORITY AND METHOD FOR OPERATING THEREOF

PRIORITY

This application is based on and claims priority under 35 U.S.C. § 119(a) to Korean Patent Application Serial No. 10-2017-0145999, filed on Nov. 3, 2017, in the Korean Intellectual Property Office, the disclosure of which is incorporated herein by reference in its entirety.

BACKGROUND

1. Field

The present disclosure generally relates to an electronic device for processing an image by using an external electronic device, and an operating method thereof.

2. Description of the Related Art

With gradual increases in performance of portable electronic devices, such as smart phones, various services are being provided by an electronic device, including basic services such as phone calls and text messaging, in addition to multimedia services such as image/video services.

To provide multimedia services, the electronic device may process a raw image acquired through an image sensor by using an image signal processor (ISP).

SUMMARY

An image processing cloud service may provide increased efficiency for performing image processing in the electronic device. The cloud service may provide a high-quality image based on an image processing technique, such as image matching, which may be difficult to perform on the electronic device.

Accordingly, the electronic device may transmit an image to a cloud server to provide a high-quality image. The cloud server may provide the electronic device with the high-quality image by using image processing information generated based on the received image. However, an image processing time may be delayed according to a network environment of the cloud server used by a plurality of users, causing a data transfer rate between the electronic device and the cloud server to decrease.

The present disclosure has been made to address the above-mentioned problems and disadvantages, and to provide at least the advantages described below.

In accordance with an aspect of the present disclosure, an electronic device includes a camera; a communication module; a display; and a processor. The processor may be configured to acquire a raw image for one or more external objects by using the camera, recognize the one or more external objects by using the raw image, segment the raw image into a plurality of regions corresponding to the one or more external objects, determine a priority for at least a partial region among the plurality of regions based on at least one object of interest among the one or more external objects, transmit data corresponding to at least the partial region to an external electronic device according to the priority so that the external electronic device generates image processing information for at least the partial region, and display the raw image of which at least the partial region is sequentially corrected according to the priority, via the display by using the image processing information.

In accordance with another aspect of the present disclosure, a method of operating an electronic device includes acquiring a raw image for one or more external objects by using the camera, recognizing the one or more external objects by using the raw image, segmenting the raw image into a plurality of regions corresponding to the one or more external objects, determining a priority for at least a partial region among the plurality of regions based on at least one object of interest among the one or more external objects, transmitting data corresponding to at least the partial region to an external electronic device according to the priority so that the external electronic device generates image processing information for at least the partial region, and displaying the raw image of which at least the partial region is sequentially corrected according to the priority, by using the image processing information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
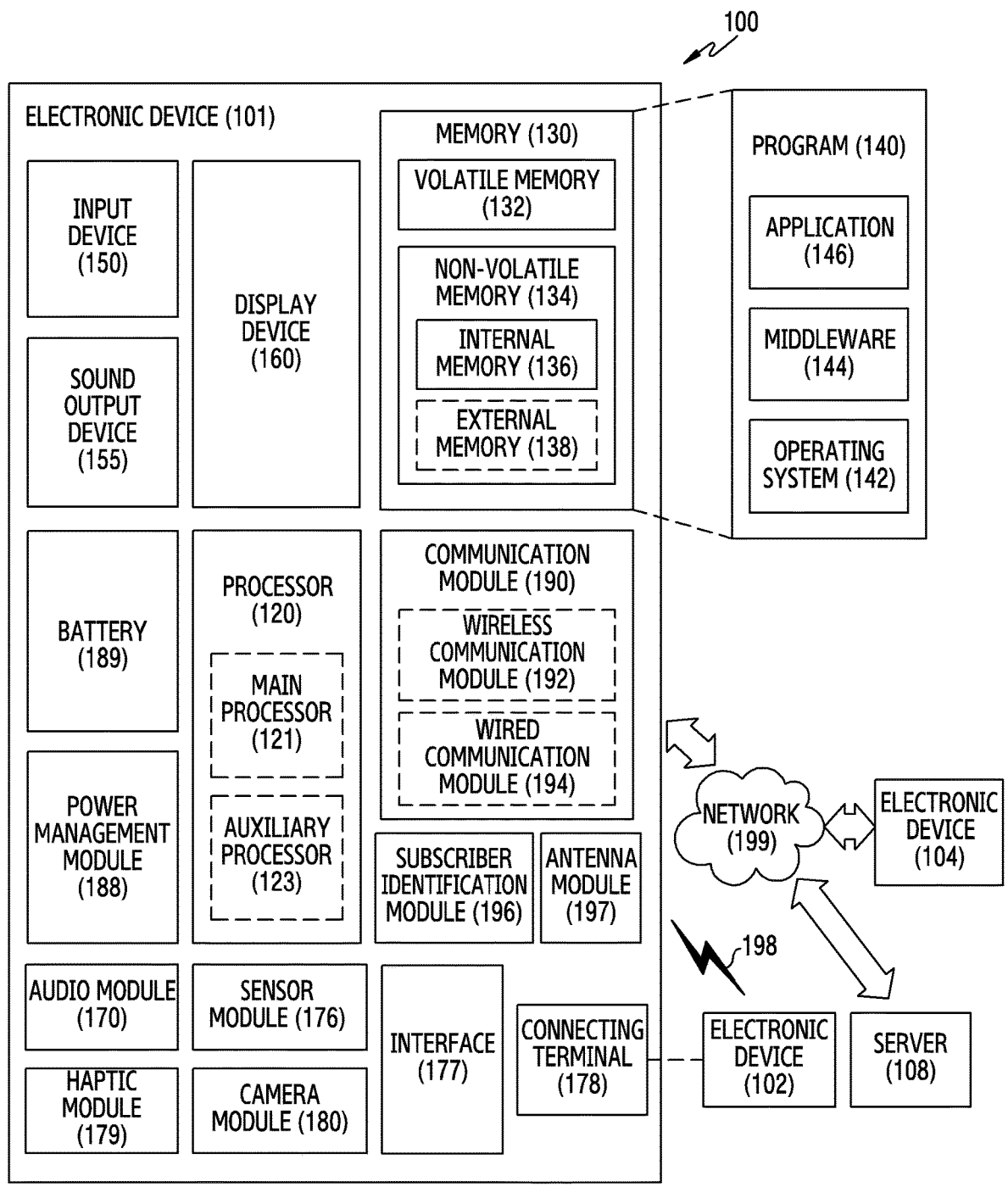
FIG. 1 is a block diagram of an electronic device in a network environment, according to an embodiment.

Various embodiments of the present disclosure are described with reference to the accompanying drawings.

However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
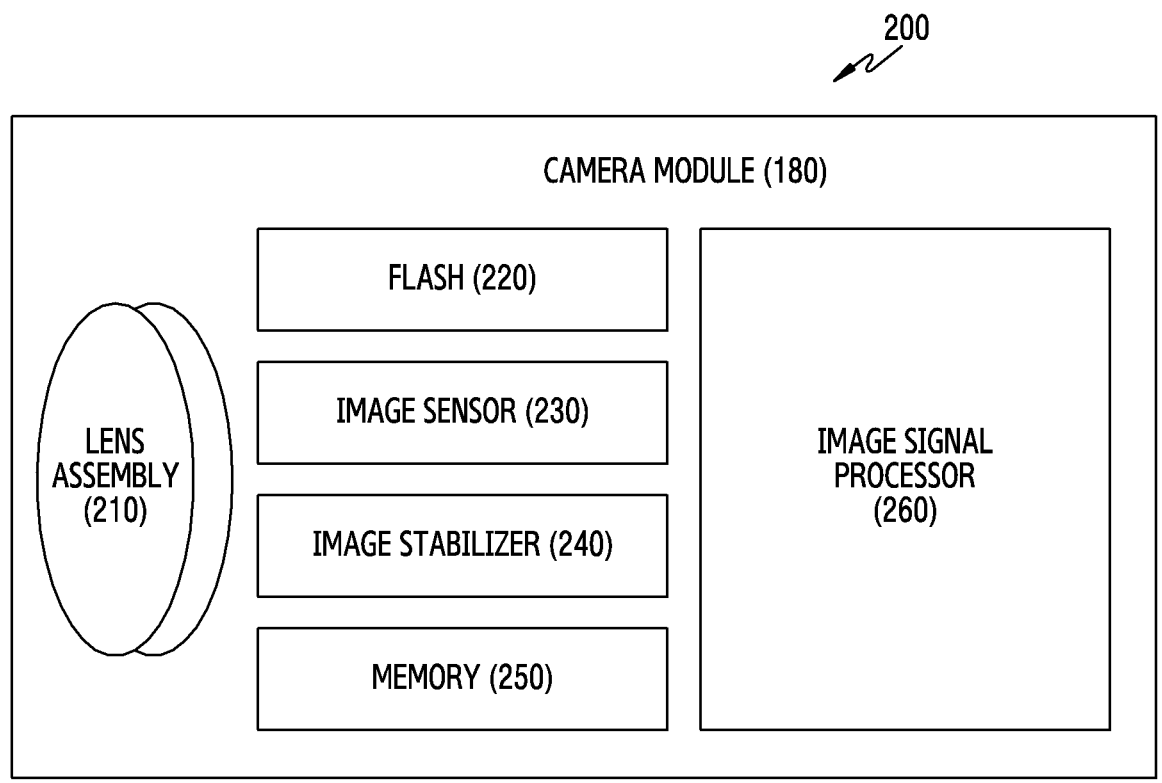
FIG. 2A is a block diagram of a camera module, according to an embodiment.

FIG. 2A is a block diagram 200 illustrating the camera module 180 according to an embodiment. Referring to FIG. 2A, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. The camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor or an acceleration sensor disposed inside or outside the camera module 180. The image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 2B:
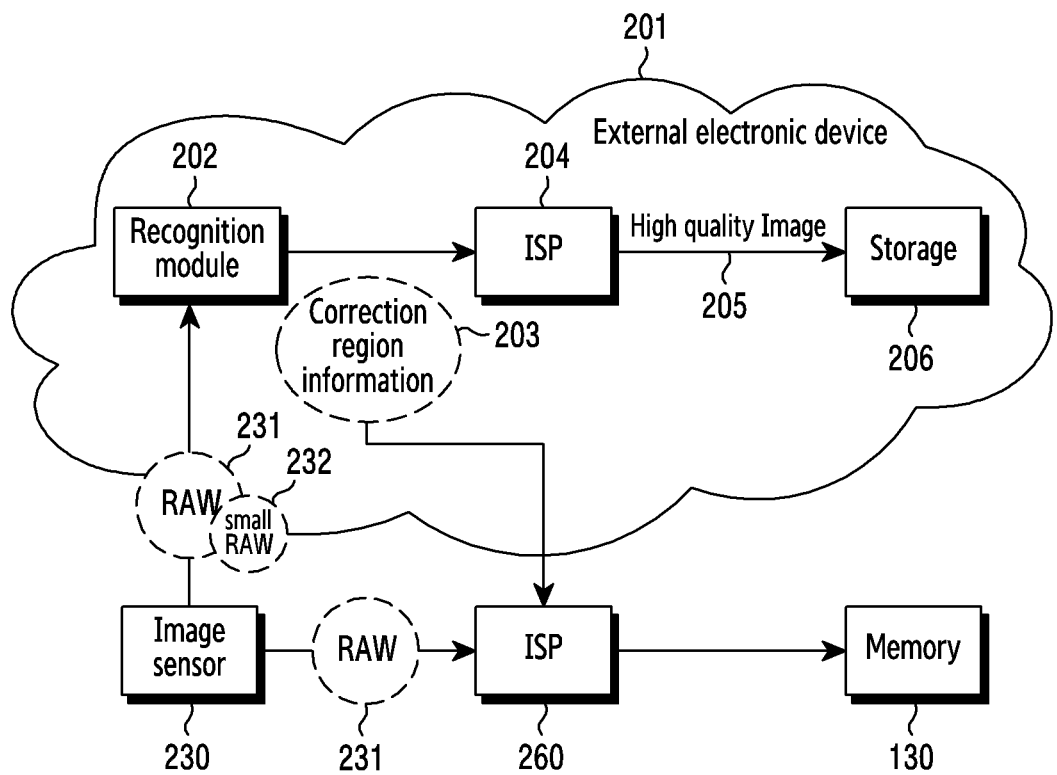
FIG. 2B illustrates a conceptual diagram of an operation of an electronic device and an external electronic device, according to an embodiment.

FIG. 2B illustrates a conceptual diagram of an operation of an electronic device and an external electronic device, according to an embodiment.

Referring to FIG. 2B, the electronic device (e.g., the electronic device 101 of FIG. 1) includes an image sensor 230, an ISP 260, and the memory 130. An external electronic device 201 (e.g., the electronic device 102 of FIG. 1, the electronic device 104 of FIG. 1, or the server 108 of FIG. 1) includes a recognition module 202, an ISP 204, and a storage 206. The recognition module 202 may be a logical module, and may be implemented as a processor of the external electronic device 201. The ISP 204 may also be implemented as a processor of the external electronic device 201. For example, the processor of the external electronic device 201 may perform both recognition and image processing. The electronic device 101 may include a communication module 190 capable of transmitting and receiving data with respect to the external electronic device 201. The external electronic device 201 may include a communication module capable of transmitting and receiving data with respect to the electronic device 101.

The image sensor 230 (e.g., the camera module 180 of FIG. 1) may acquire an image for an external object, and may generate a raw image 231 corresponding thereto. The image sensor 230 may forward the raw image 231 to the ISP 260. The image sensor 230 may generate a small raw image 232 and transmit it to the external electronic device 201 via the communication module. Alternatively, instead of the image sensor 230, the processor 120 of the electronic device 101 may generate the small raw image 232 and transmit the generated small raw image 232 to the external electronic device 201 via the communication module 190. The image sensor 230 may transmit the raw image 231 in a compressed state to the ISP 260 or the external electronic device 201. The raw image 231 may be compressed and stored in a memory inside the image sensor 230 to process part of the raw image 231. The recognition module 202 of the external electronic device 201 may acquire the small raw image 232 via the communication module, and may segment at least one image region from the small raw image 232. The recognition module 202 may recognize at least one image region divided as a result of the segmentation. Information associated with a plurality of image regions generated from the recognition module 202 may be generated. For example, the information may be correction region information 203 including at least one of a recognition result and coordinate information of the image region. The correction region information 203 may be transmitted to the electronic device 101. The ISP 260 may correct the raw image 231 by using the correction region information 203, thereby generating a corrected raw image 205. The corrected image 205 may have, for example, a YUV format (e.g., a YCbCr format). The corrected image 205 may be stored in the memory 130. Alternatively, the corrected image 205 may be compressed, for example, in accordance with a Joint Photographic Experts Group (JPEG) scheme, and the compressed image may be stored in the memory 130.

The raw image 231 provided from the image sensor 230 may be transmitted to the external electronic device 201 separately from the small raw image 232. Since the raw image 231 is larger in capacity than the small raw image 232, the small raw image 232 may first be transmitted to the external electronic device 201, and thereafter the raw image 231 may be transmitted to the external electronic device 201. For example, the small raw image 232 may be transmitted to the external electronic device 201 while the ISP 260 performs correction on the raw image 231. The raw image 231 may be uploaded to the external electronic device 201 in an intact manner as generated by the image sensor 230, or a pre-processed image subjected to lens distortion compensation or noise cancellation may be updated.

The aforementioned preprocessing may be performed in the external electronic device 201. The external electronic device 201 may perform demosaic processing or image format conversion or may perform pre-processing for increasing an image recognition rate. The ISP 204 of external electronic device 201 may correct the received raw image 231. The external electronic device 201 may use the correction region information 203 previously generated to correct the raw image 231, or may correct the raw image 231 by using extended correction region information. The raw image 231 may have a higher quality than the small raw image 232. Accordingly, the ISP 204 of the external electronic device 201 may acquire more specific extended correction region information from a high quality image. The ISP 204 may use the previously generated correction region information and the raw image 231 together to generate the extended correction region information. The ISP 204 may use the extended correction region information to correct the raw image 231, thereby acquiring the high quality image 205. The high quality image 205 may be stored in the storage 206 of the external electronic device 201, and may be downloaded to the electronic device 101.

The electronic device may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

According to an embodiment, an electronic device may include a camera; a communication module; a display; and a processor. The processor may be configured to acquire a raw image for one or more external objects by using the camera, recognize the one or more external objects by using the raw image, segment the raw image into a plurality of regions corresponding to the one or more external objects, determine a priority for at least a partial region among the plurality of regions based on at least one object of interest among the one or more external objects, transmit data corresponding to at least the partial region to an external electronic device according to the priority so that the external electronic device generates image processing information for at least the partial region, and display the raw image of which at least the partial region is sequentially corrected according to the priority, via the display by using the image processing information.

According to an embodiment, the processor may further be configured to receive additional image processing information corresponding to a different partial region of the raw image among the plurality of regions while displaying the raw image, correct the different partial region of the raw image by using the additional image processing information, and display the raw image of which the different partial region is corrected.

According to an embodiment, the processor may further be configured to determine a transmission order of data corresponding to at least the partial region additionally based on a communication environment with the external electronic device.

According to an embodiment, the processor may be further configured to receive the corrected raw image generated by the external electronic device by using the image processing information via the communication module.

According to an embodiment, the processor may be further configured to sequentially correct at least the partial region according to the priority by using the image processing information.

According to an embodiment, the processor may be further configured to select the object of interest based on at least one of a speed detected from the raw image among the one or more external objects, a capture frequency of the one or more external objects, a movement of the one or more external objects, a size of the one or more external objects, a user preference of the one or more external objects, an image processing time of the one or more external objects, and additional objects subjected to focus adjustment among the one or more external objects.

According to an embodiment, the processor may be further configured to determine whether a movement variation of the electronic device is less than a reference variation of the electronic device, recognize the external objects if the movement variation of the electronic device is less than the reference variation, determine whether the movement variation of the external objects is less than the reference variation based on the recognized external objects, and select the object of interest if the movement variation of the external objects is less than the reference variation.

According to an embodiment, the processor may further be configured to transmit the data corresponding to at least the partial region to the external electronic device according to the priority so that the external electronic device generates the image processing information for at least the partial region before the raw image is captured.

According to an embodiment, the processor may be further configured to receive the corrected raw image generated by the external electronic device by using the image processing information via the communication module after the raw image is captured.

According to an embodiment, the processor may be configured to sequentially correct at least the partial region according to the priority by using the image processing information after the raw image is captured.

Figure 3:
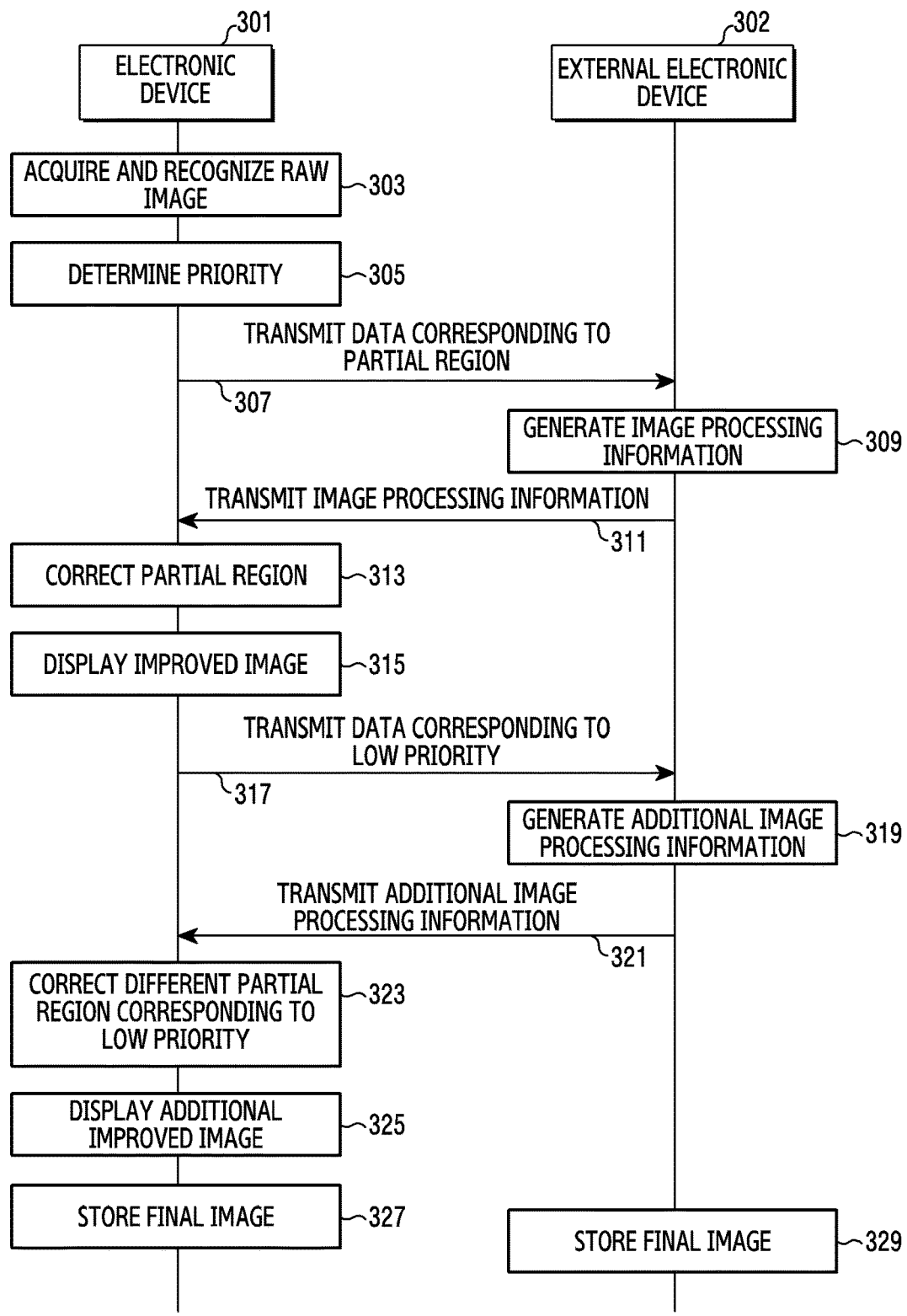
FIG. 3 is a flowchart of an operation of an electronic device and an external electronic device, according to an embodiment.

FIG. 3 is a flowchart of an operation of an electronic device and an external electronic device, according to an embodiment.

The electronic device may include the electronic device 101 of FIG. 1 or at least part (e.g., the processor 120) of the electronic device 101. In addition, the external electronic device may include the electronic device 102 of FIG. 1, the electronic device 104 of FIG. 1, the server 108 of FIG. 1, or the external electronic device 201 of FIG. 2.

Referring to FIG. 3, in operation 303, an electronic device 301 performs raw image acquisition and recognition by capturing a raw image via the camera (e.g., the camera module 180 of FIG. 1). For example, the processor 120 may apply an object recognition algorithm or a texture recognition algorithm to the acquired raw image to recognize external objects. In addition, the processor 120 may segment the raw image into a plurality of regions based on the external objects. In addition, the processor 120 may select at least one object of interest among the external objects, and may identify at least a partial region corresponding to at least one object of interest among the plurality of regions.

In operation 305, the electronic device 301 determines a priority for at least a partial region of the raw image. For example, the processor 120 may determine a priority for a partial region corresponding to at least one object of interest among a plurality of regions included in the raw image.

In operation 307, the electronic device 301 transmits data corresponding to the partial region to the external electronic device 302 based on the determined priority. For example, the data corresponding to the partial region may include at least one of an image corresponding to the partial region, location information of an object of interest, direction information of the object of interest, capture place information, capture time information, angle-of-view information, and rotation information of the electronic device 301.

According to an embodiment, the electronic device 301 may determine a transmission order of data corresponding to at least a partial region based on a communication environment with an external electronic device 302. For example, when a data transfer rate is delayed according to the communication environment, the electronic device 301 may first transmit data corresponding to a partial region having a small amount of data.

In operation 309, the external electronic device 302 generates image processing information based on the data corresponding to the partial region. For example, the image processing information may include at least one of auto exposure information, improved auto white balance information, improved auto focus information, improved object recognition information, and improved depth map information.

In operation 311, the external electronic device 302 transmits the image processing information to the electronic device 301. For example, the external electronic device 302 may transmit the generated image processing information to the electronic device 301 via a communication interface (e.g., the communication module 190 of FIG. 1).

In operation 313, the electronic device 301 corrects at least the partial region. For example, the processor 120 may correct at least the partial region of the raw image based on the received image processing information.

In operation 315, the electronic device 301 displays an improved image. For example, the processor 120 may display the improved image corresponding to the raw image of which at least a partial region is corrected, via the display device 160.

According to an embodiment, the electronic device 301 and the external electronic device 302 may repeatedly perform operations 307 to 315. For example, the electronic device 301 and the external electronic device 302 may sequentially process each of the plurality of partial regions.

In operation 317, the electronic device 301 transmits data corresponding to a low priority. For example, the data corresponding to the low priority may be a different partial region among the plurality of regions. The different partial region may be a region having a lower priority than a partial region which corresponds to a high priority and thus has already been processed. Even after the data corresponding to the low priority is transmitted, the electronic device 301 may transmit data corresponding to a very next priority. Data (e.g., a partial region) corresponding to each priority may be transmitted according to the determined priority.

In operation 319, the external electronic device 302 generates additional image processing information. For example, the additional image processing information may be different image processing information corresponding to a different partial region among the plurality of partial regions. The external electronic device 302 may generate additional image processing information based on data corresponding to a low priority. In addition, the external electronic device 302 may generate the additional image processing information by using image processing information which has already been processed. The external electronic device 302 may generate very next (e.g., subsequent) additional image processing information based on data corresponding to a very next priority even after the additional image processing information is generated. For example, the external electronic device 302 may sequentially and repeatedly generate image processing information for correcting data (e.g., a partial region) corresponding to each priority.

According to an embodiment, the external electronic device 302 may determine that image quality improvement is not required as a result of analyzing data corresponding to a low priority, and may not generate additional image processing information.

In operation 321, the external electronic device 302 transmits the additional image processing information to the electronic device 301. For example, the external electronic device 302 may transmit a plurality of pieces of image processing information for correcting data (e.g., a partial region) corresponding to each priority in sequence to the electronic device 301.

In operation 323, the electronic device 301 corrects a different partial region corresponding to a low priority. For example, the processor 120 may additionally correct a different partial region of the raw image by using different image processing information. The processor 120 may correct a different partial region corresponding to a low priority, and thereafter correct a partial region corresponding to a very next priority. For example, the processor 120 may sequentially correct a plurality of partial regions corresponding to respective priorities.

In operation 325, the electronic device 301 displays an additional improved image. For example, the processor 120 may sequentially display an additional improved image of which a partial region corresponding to each priority is corrected. After displaying the additional improved image of which a partial region corresponding to a low priority is corrected via the display device 160 of FIG. 1, the processor 120 may display an additional improved image of which a partial region corresponding to a very next priority is corrected. That is, the processor 120 may sequentially display a plurality of additional improved images. For example, an additional improved image to be displayed next may be an image acquired through accumulated corrections of additional improved images previously displayed. Therefore, among the additional improved images sequentially displayed, a last displayed additional improved image may be an image having best image quality.

According to an embodiment, the electronic device 301 and the external electronic device 302 may repeatedly perform operations 317 to 325. For example, the electronic device 301 and the external electronic device 302 may sequentially correct a plurality of partial regions based on a priority, and may sequentially display an additional improved image subjected to correction.

In operation 327, upon determining that image quality improvement of the raw image is complete, the electronic device 301 stores a final image subjected to image quality improvement of the raw image. In addition, in operation 329, the external electronic device 302 associated with the electronic device 301 receives the final image from the electronic device 301 and stores the received final image.

According to an embodiment, an operation of correcting the raw image may be performed in the external electronic device 302. For example, the external electronic device 302 may generate an improved image and an additional improved image respectively based on image processing information and additional image processing information.

According to an embodiment, the operation of correcting the raw image may be performed together in the electronic device 301 and the external electronic device 302. An operation of generating the improved image may be performed in the electronic device 301, and an operation of improving the additional improved image may be performed in the external electronic device 302. On the other hand, the operation of generating the improved image may be performed in the external electronic device 302, and the operation of improving the additional improved image may be performed in the electronic device 301.

The image processing operation of the electronic device 301 will be described below in detail with reference to FIG. 4 and FIG. 5.

Figure 4:
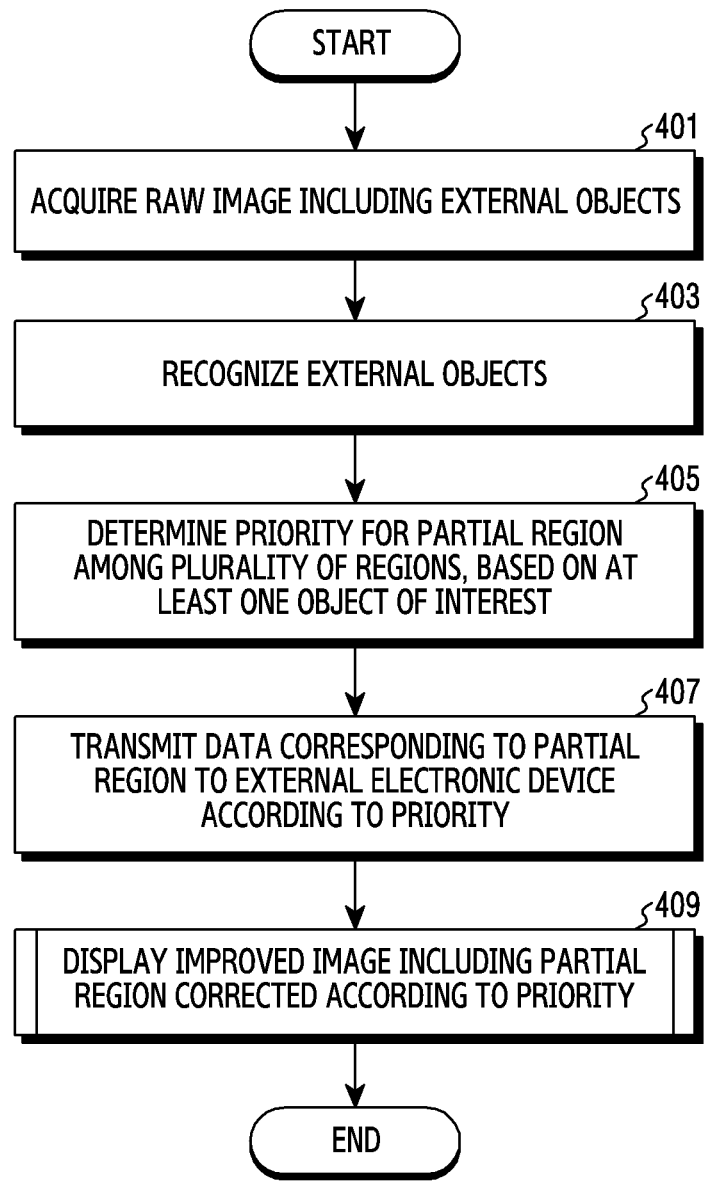
FIG. 4 is a flowchart of an operation of an electronic device, according to an embodiment.

FIG. 4 is a flowchart of an operation of an electronic device, according to an embodiment. The electronic device may include the electronic device 101 of FIG. 1, the electronic device 301 of FIG. 3, or at least part (e.g., the processor 120) of the electronic device 101. In addition, the external electronic device may include the electronic device 102 of FIG. 1, the electronic device 104 of FIG. 1, the server 108 of FIG. 1, the external electronic device 201 of FIG. 2, or the external electronic device 302 of FIG. 3.

Referring to FIG. 4, in operation 401, the electronic device 301 acquires a raw image including one or more external objects by capturing an image via the camera module 180 of FIG. 1. The raw image may be an image which has not been subjected to image processing.

In operation 403, the electronic device 301 recognizes one or more external objects by using the raw image. For example, the processor 120 may recognize the external objects by applying an object recognition algorithm or a text recognition algorithm to the acquired raw image. The processor 120 may recognize at least one image region by using various recognition algorithms, and may recognize one or more external objects by using a recognition algorithm acquired through machine learning or deep leaning. The processor 120 may segment the raw image into a plurality of regions based on the recognized one or more external objects. The plurality of regions may be a region which can be segmented by an outline surrounding each of the one or more external objects.

In operation 405, the electronic device 301 determines a priority for a partial region among the plurality of regions based on at least one object of interest. For example, the electronic device 301 may select at least one object of interest from one or more external objects. The object of interest may be included in at least a partial region among the plurality of regions. The object of interest may be determined by considering at least one element among a speed detected from the raw image among the external objects, a capture frequency of the external objects, a size of the external objects, a user preference of the external objects detected based on a user database stored in the external electronic device 302, an image processing time of the external objects, and objects subjected to focus adjustment among the external objects. For example, the processor 120 may determine at least one element for selecting the object of interest based on a user's configuration or database information received from the external electronic device 302. The database information received from the external electronic device 302 may include at least one of a capture frequency of external objects, a user preference of the external objects, and an image processing time of the external objects.

According to an embodiment, the processor 120 may select an object of interest by considering any one of the elements for selecting the object of interest. For example, the processor 120 may select only external objects which have a detection speed greater than or equal to a threshold speed based on a detection speed of the external objects. The detection speed may be a movement speed of an external object detected through the raw images. In addition, the processor 120 may detect a movement of the external objects and select an external object of which a detected movement is less than or equal to a threshold value as the object of interest.

Additionally, the processor 120 may select the object of interest by considering one or more of the elements for selecting the object of interest. For example, the processor 120 may select an object A as the object of interest based on the detection speed of the external objects, or may select an object B as the object of interest based on the user preference.

The processor 120 may select objects of interest by considering an image processing time. For example, when the plurality of external objects correspond to the object of interest, the processor 120 may select only some of the plurality of external objects as the objects of interest by considering that the image processing time will be delayed. The processor 120 may not select an external object which requires a long time for image processing. The processor 120 may select an external object which requires a short time for image processing as the object of interest. According to an embodiment, a priority for a partial region based on the element for selecting the object of interest may imply a priority for processing at least one object of interest.

The processor 120 may determine the priority by preferentially considering at least one or more of the elements to be selected as objects of interest. For example, the processor 120 may preferentially consider a detection speed of an object over (e.g., with a higher priority) the user preference, and may set a priority of an object A selected as the object of interest based on the detection speed to be higher than a priority of an object B selected as the object of interest based on the user preference.

According to an embodiment, when the object of interest is selected based on any one of the elements to be selected as the object of interest, the processor 120 may determine the priority according to a value corresponding to the one element. For example, the processor 120 may select objects C and D having a higher detection speed than a threshold speed, and may set a priority of the object C to have a higher detection speed than the priority of object D.

In operation 407, the electronic device 301 transmits data corresponding to at least a partial region to the external electronic device 302 according to a priority so that the external electronic device 302 generates image processing information for at least the partial region. For example, the processor 120 may sequentially transmit a plurality of pieces of data corresponding to the partial region according to a determined priority to the external electronic device 302 via the communication module 190 of FIG. 1. The processor 120 may first transmit data corresponding to a partial region including an object of interest having a top priority to the external electronic device 302 via the communication module 190, and thereafter may transmit data corresponding to a partial region including an object of interest corresponding to a lower priority to the external electronic device 302 via the communication module 190.

According to an embodiment, the processor 120 may determine a transmission order of data corresponding to one or more partial regions based on a communication environment with respect to the external electronic device 302. When a data transmission speed is decreased according to the communication environment of the external electronic device 302, the processor 120 may first transmit data corresponding to a partial region having a small amount of data.

In operation 409, the electronic device 301 uses image processing information to display an improved image including at least a partial region sequentially corrected according to a priority. For example, the processor 120 may sequentially correct a plurality of partial regions, and may display, on the display device 160, an improved image with partial regions are corrected.

According to an embodiment, the electronic device 301 may receive additional image processing information corresponding to a different partial region (e.g., a first partial region) among a plurality of regions while displaying the improved image. The electronic device 301 may correct the different partial region of a raw image by using the additional image processing information. In addition, the electronic device 301 may display an additional improved image with a different partial region (e.g., a second partial region) as additionally corrected. For example, the electronic device 301 may display an improved image of which a partial region corresponding to a low priority is corrected, and thereafter may display an additional improved image of which a partial region corresponding to a very next priority is corrected. The electronic device 301 may sequentially correct a plurality of partial regions based on one or more priorities, and may sequentially display additional improved images of which a plurality of partial regions are sequentially corrected. An operation of displaying the improved image will be described below in detail with reference to FIG. 5.

Figure 5:
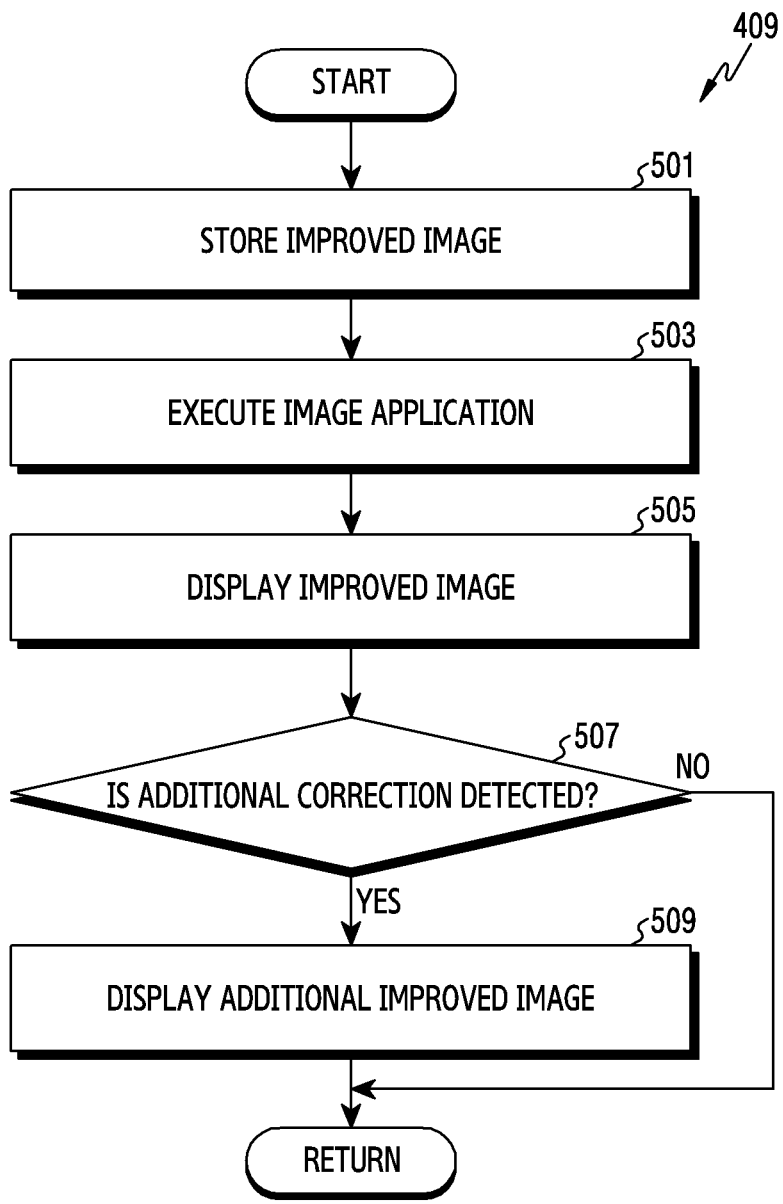
FIG. 5 is a flowchart for displaying an improved image in an electronic device, according to an embodiment.

FIG. 5 is a flowchart for displaying an improved image in an electronic device, according to an embodiment. The electronic device may include the electronic device 101 of FIG. 1, the electronic device 301 of FIG. 3, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, or the external electronic device 302 of FIG. 3.

Referring to FIG. 5, in operation 501, the electronic device 301 stores an improved image. For example, the processor 120 may sequentially store the improved image including sequentially corrected partial regions into the electronic device 301 (e.g., the memory 130). Whenever one partial region is corrected, the processor 120 may store an improved image by applying it. Alternatively, the processor 120 may store an improved image including partial regions corrected with a specific period into the memory 130.

In operation 503, the electronic device 301 executes an image application. For example, the processor 120 executes an image application (e.g., a gallery) based on a user's input.

In operation 505, the electronic device 301 displays the improved image. For example, upon detecting a user's input for selecting the improved image from the executed application, the processor 120 may display the improved image on the display device 160 of FIG. 1.

In operation 507, the electronic device 301 determines if additional correction is detected. For example, the processor 120 may detect correction for a different partial region among a plurality of regions while displaying the improved image. The different partial region may be a region which is not yet subjected to image processing and which corresponds to a low priority.

If no additional correction is detected the electronic device 301 returns to the previous procedure and may display the improved image. Alternatively, the electronic device 301 may end the operation of displaying the improved image.

If additional correction is detected, proceeding to operation 509, the electronic device 301 displays an additional improved image. For example, the processor 120 may replace the improved image currently being displayed with the additional improved image, and may display the additional improved image through an image application. Alternatively, the processor 120 may display the additional improved image together with the improved image.

According to an embodiment, the electronic device 301 may repeatedly perform operations 507 and 509. For example, the electronic device 301 may display an additional improved image of which a partial region corresponding to a low priority is corrected, or may replace the additional improved image currently being displayed with an additional improved image of which a partial region corresponding to a very next priority is corrected.

An operation of acquiring a final image having improved image quality from a raw image may include a preview operation in which a raw image temporarily acquired via a camera is being displayed via a display, an image processing operation of the acquired raw image in the external electronic device 201, and an image processing operation of the capture raw image in the electronic device 101. The preview operation may be an operation in which a user prepares for capturing an image by focusing a camera on external objects to be captured.

An operation of generating image processing information in preparation for the preview operation is described below in detail with reference to FIG. 6 to FIG. 16. An operation of correcting a raw image in an electronic device is described below with reference to FIG. 6 to FIG. 13. An operation in which a raw image is corrected by an external electronic device is described below with reference to FIG. 14 to FIG. 16.

Figure 6:
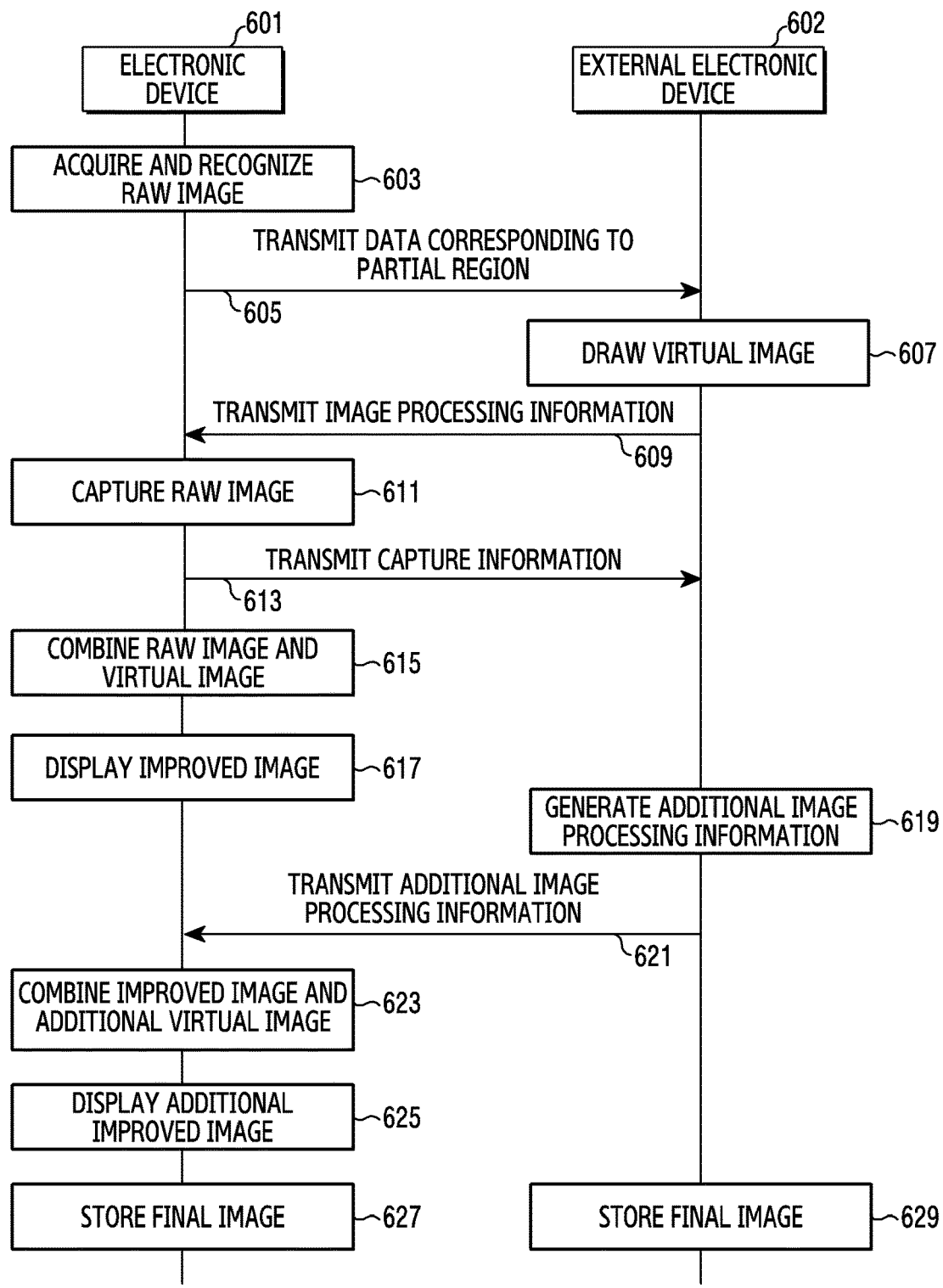
FIG. 6 is a flowchart of an operation of an electronic device and an external electronic device, according to an embodiment.

FIG. 6 is a flowchart of an operation of an electronic device and an external electronic device, according to an embodiment. The electronic device may include the electronic device 101 of FIG. 1, the electronic device 301 of FIG. 3, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, or the external electronic device 302 of FIG. 3.

Referring to FIG. 6, in operation 603, an electronic device 601 acquires and recognizes a raw image during a preview via the camera module 180 of FIG. 1. For example, the processor 120 may recognize one or more external objects from the raw image acquired during the preview. In addition, the processor 120 may segment the raw image into a plurality of regions based on one or more external objects. Further, the processor 120 may select at least one object of interest among the one or more external objects. Additionally, the processor 120 may identify at least one partial region corresponding to at least one object of interest.

In operation 605, the electronic device 601 transmits data corresponding to at least a partial region of the raw image to an external electronic device 602. The data corresponding to the partial region may include at least one of an image corresponding to the partial region, location information of an object of interest, direction information of the object of interest, capture place information, capture time information, angle-of-view information, and rotation information of the electronic device 601.

In operation 607, the external electronic device 602 draws a virtual image based on data corresponding to the partial region. For example, the external electronic device 602 may draw the virtual image before the preview to generate image processing information for improving image quality of the partial region. The drawn virtual image may have a similarity with an object of interest corresponding to the partial region, and may have some differences.

In operation 609, the external electronic device 602 transmits the image processing information generated based on the data corresponding to the partial region. The image processing information may include the drawn virtual image. In addition, the image processing information may include at least one of auto exposure information, improved auto white balance information, improved auto focus information, improved object recognition information, and improved depth map information.

In operation 611, the electronic device 601 captures the raw image. For example, the processor 120 may detect a user's capture input by using the camera module 180, and may capture the raw image based on the detected capture input.

In operation 613, upon capturing the raw image, the electronic device 601 transmits capture information to the external electronic device 602. The capture information may include information on at least part of the acquired raw image upon capturing the raw image or may include information on a change of the raw image before and after capturing the raw image.

In operation 615, the electronic device 601 combines the raw image and the virtual image. For example, the processor 120 may generate an improved image by combining the captured raw image and the virtual image received from the external electronic device 602.

In operation 617, the electronic device 601 displays the improved image. The improved image may be an image of which a partial region corresponding to a high priority is corrected.

In operation 619, the external electronic device 602 generates additional image processing information. For example, the external electronic device may generate additional image processing information corresponding to a different partial region corresponding to a low priority. The external electronic device 602 may generate additional image processing information corresponding to a partial region which is not yet drawn and which corresponds to a low priority. The external electronic device 602 may generate the additional image processing information based on information on a change of the raw image before and after capturing the raw image. In addition, the external electronic device 602 may generate additional image processing information for correcting a partial region corresponding to a next lowest priority. For example, the external electronic device 602 may sequentially generate a plurality of pieces of additional image processing information according to the determined priority.

According to an embodiment, the external electronic device 602 may determine that image quality improvement is not required as a result of analyzing data corresponding to a different partial region, and may not generate additional image processing information. In this case, an operation of generating an additional improved image may be omitted, and an improved image of which a partial region corresponding to an object of interest is completely corrected may be stored as a final image.

In operation 621, the external electronic device 602 transmits additional image processing information to the electronic device 601. The additional image processing information may include an additional virtual image corresponding to a partial region which is not yet drawn and which corresponds to a low priority. For example, even after additional image processing information corresponding to a low priority is transmitted, the external electronic device 602 may transmit additional image processing information corresponding to a very next priority. For example, the external electronic device 602 may sequentially transmit a plurality of pieces of additional image processing information corresponding to respective priorities according to the determined priority.

In operation 623, the electronic device 601 combines an improved image and an additional virtual image. For example, the processor 120 may sequentially combine the improved image and the additional virtual image whenever the additional image processing information is received.

In operation 625, the electronic device 601 displays an additional improved image. For example, the processor 120 may sequentially display an additional improved image of which a partial region corresponding to each priority is corrected. After displaying an additional improved image of which a partial region corresponding to a low priority is corrected, the processor 120 may display an additional improved image of which a partial region corresponding to a very next priority is corrected. An additional improved image to be displayed next may be an image acquired through accumulated corrections of additional improved images previously displayed. Therefore, among the additional improved images sequentially displayed, a last displayed additional improved image may be an image having best image quality among the additional improved images.

In operation 627, upon determining that image quality improvement of the raw image is complete, the electronic device 601 stores a final image subjected to image quality improvement of the raw image. In addition, in operation 629, the external electronic device 602 associated with the electronic device 601 also receives the final image from the electronic device 601 and stores the received final image.

The external electronic device 602 may additionally improve image quality of the final image even after the final image is stored. The external electronic device 602 may transmit the final image of which image quality is additionally improved to the electronic device 601.

According to an embodiment, operation 605 of the electronic device 601 and operations 607 and 609 of the external electronic device 602 may be repeatedly performed. For example, the electronic device 601 may sequentially transmit data corresponding to a plurality of partial regions to the external electronic device 602 according to a priority, and the external electronic device 602 may transmit a plurality of pieces of image processing information respectively corresponding to the plurality of partial regions to the electronic device 601.

The electronic device 601 may transmit the entirety or part of the data corresponding to the plurality of partial regions before capturing the raw image to the external electronic device 602 by considering an image processing time. In a case of transmitting only part of the data corresponding to the plurality of partial regions before capturing the raw image, the electronic device 601 may sequentially or concurrently transmit data corresponding to not-transmitted partial regions to the external electronic device 602 after capturing the raw image.

According to an embodiment, the electronic device 601 and the external electronic device 602 may repeatedly perform operations 619 to 625. For example, the electronic device 601 may sequentially generate and display improved images by sequentially combining the raw image and the virtual image according to a plurality of pieces of image processing information.

An image processing operation of the electronic device 601 will be described below with reference to FIG. 7 and FIG. 12, and an image processing operation of the external electronic device 602 will be described below with reference to FIG. 13.

Figure 7:
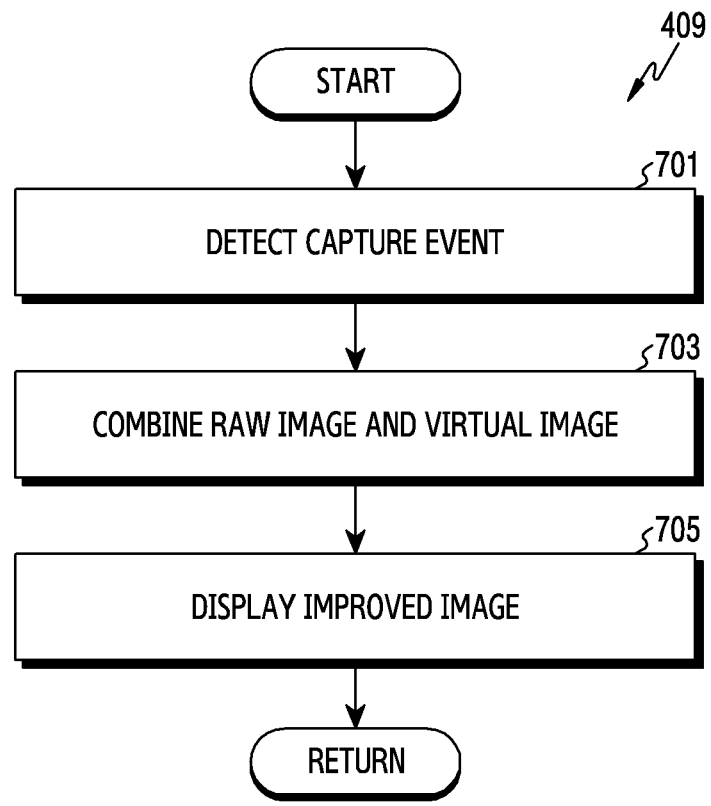
FIG. 7 is a flowchart of an operation of an electronic device, according to an embodiment.
Figure 8:
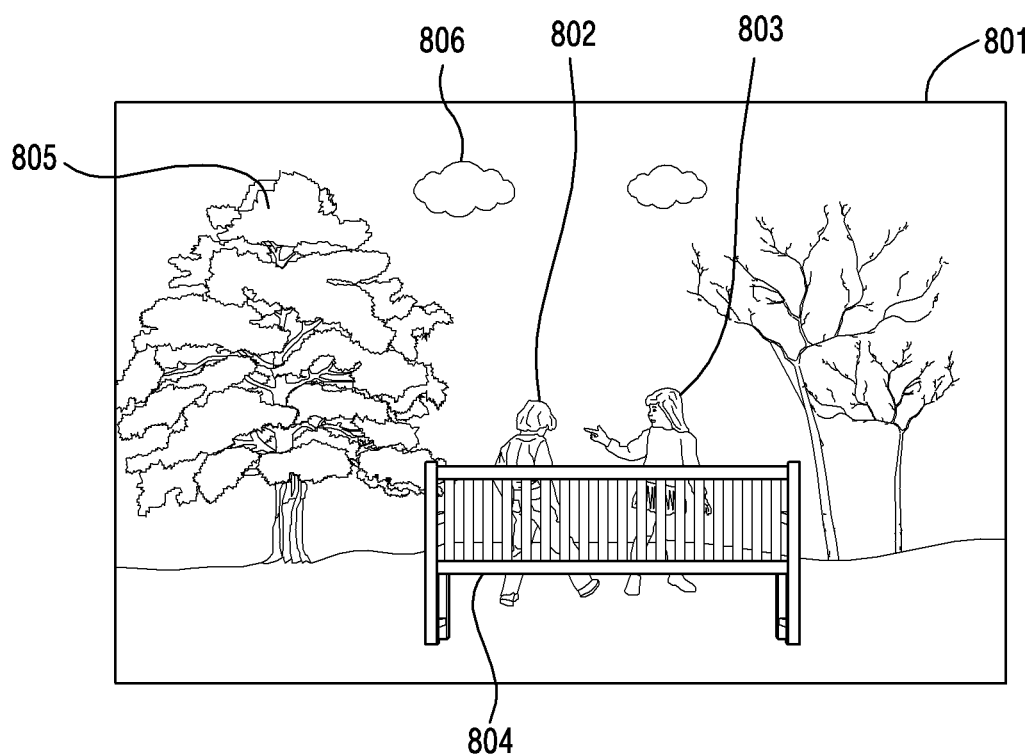
FIG. 8 is a diagram of an operation of an electronic device, according to an embodiment.

FIG. 7 is a flowchart of an operation of an electronic device, according to an embodiment. FIG. 8 is a diagram of an operation of an electronic device, according to an embodiment. The electronic device may include the electronic device 101 of FIG. 1, the electronic device 301 of FIG. 3, the electronic device 601 of FIG. 6, or at least part (e.g., the processor 120) of the electronic device 101. In addition, in the following description, the external electronic device may include the electronic device 102 of FIG. 1, the electronic device 104 of FIG. 1, the external electronic device 201 of FIG. 2, the external electronic device 302 of FIG. 3, or the external electronic device 602 of FIG. 6.

Operation 409 of FIG. 4 will be described below with reference to FIG. 7. When operations of the electronic device of FIG. 7 are the same as operations of the electronic device of FIG. 4, descriptions thereof will be omitted to avoid redundancy.

Referring to FIG. 8, the electronic device 601 may acquire a raw image 801 including one or more external objects during a preview. The electronic device 601 may use the raw image 801 to recognize one or more external objects, and may segment the raw image into a plurality of regions based on one or more external objects. For example, as shown in FIG. 8, objects included in the raw image 801 may be recognized, and the object may be a first person object 802, a second person object 803, a chair object 804, a tree object 805, or a cloud object 806. The plurality of regions may be regions surrounding each of the first person object 802, the second person object 803, the chair object 804, the tree object 805, and the cloud object 806.

The electronic device 601 may select at least one object of interest among one or more external objects. For example, the processor 120 may select an object of interest by considering only any one of the elements for selecting the object of interest. The processor 120 may select only external objects which have a detection speed greater than or equal to a threshold speed based on a detection speed of the external objects. If a detection speed of the first person object 802 and the second person object 803 is greater than or equal to a threshold speed among objects of FIG. 8, the processor 120 may select the first person object 802 and the second person object 803 as the object of interest.

The processor 120 may select the object of interest by considering at least one or more of the elements for selecting the object of interest. For example, the processor 120 may select the first person object 802 and the second person object 803 as the object of interest based on the detection speed of the external objects, and may select the chair object 804 as the object of interest based on the user preference. Upon identifying information frequently captured by a user in a chair which is the same as or similar to the chair object 804 of FIG. 8, the processor 120 may determine that the user prefers the chair object 804 to be selected as the object of interest.

The processor 120 may select objects of interest by considering an image processing time. For example, when the plurality of external objects correspond to the object of interest, the processor 120 may select only some of the plurality of external objects as the objects of interest by considering that the image processing time will be delayed. Upon determining that the image processing time for the first person object 802, the second person object 803, and the chair object 804 will exceed a threshold time, the processor 120 may select only some but not all of the first person object 802, the second person object 803, and the chair object 804 as objects of interest.

An operation of transmitting data corresponding to a partial region before capturing the raw image 801 may be repeated several times. The number of repetitions may be equal to or less than the number of partial regions selected based on objects of interest.

Referring to FIG. 7, in operation 701, the electronic device 601 detects a capture event. For example, the processor 120 may detect an event which indicates that the raw image 801 is captured from the camera module 180 of FIG. 1.

The electronic device 601 may transmit the entirety or part of at least a partial region corresponding to at least one object of interest to the external electronic device 602 entirely or partially before capturing the raw image 801. In a case of transmitting only part of the partial region, the electronic device 601 may transmit a partial region not yet transmitted to the external electronic device 602 after capturing the raw image 801. A transmission order of the partial regions may be based on a priority.

The electronic device 601 may combine the raw image 801 and the virtual image based on image processing information transmitted from the external electronic device 602. For example, the processor 120 may sequentially or concurrently combine the captured raw image 801 and the received virtual image based on the image processing information. A plurality of virtual images 801 may be received until the raw image 801 is captured, and the virtual images may be sequentially combined with the raw image 801 according to a reception order. Alternatively, the received plurality of virtual images and the raw image 801 may be combined concurrently.

In operation 705, the electronic device 601 displays an improved image by combining the raw image 801 and the virtual image. For example, the processor 120 may sequentially or concurrently acquire the improved image according to an order of receiving a plurality of virtual images.

The electronic device 601 may transmit to the external electronic device 602 a different partial region corresponding to a low priority among a plurality of regions after the capture event, and may acquire an additional improved image by receiving additional image processing information corresponding to a different partial region corresponding to a low priority.

The electronic device 601 may sequentially acquire an additional improved image to sequentially display the additional improved image to the display device 160 of FIG. 1. In addition, the electronic device 601 may detect a user input from an image application to sequentially display the additional improved image to the display device 160.

Figure 9:
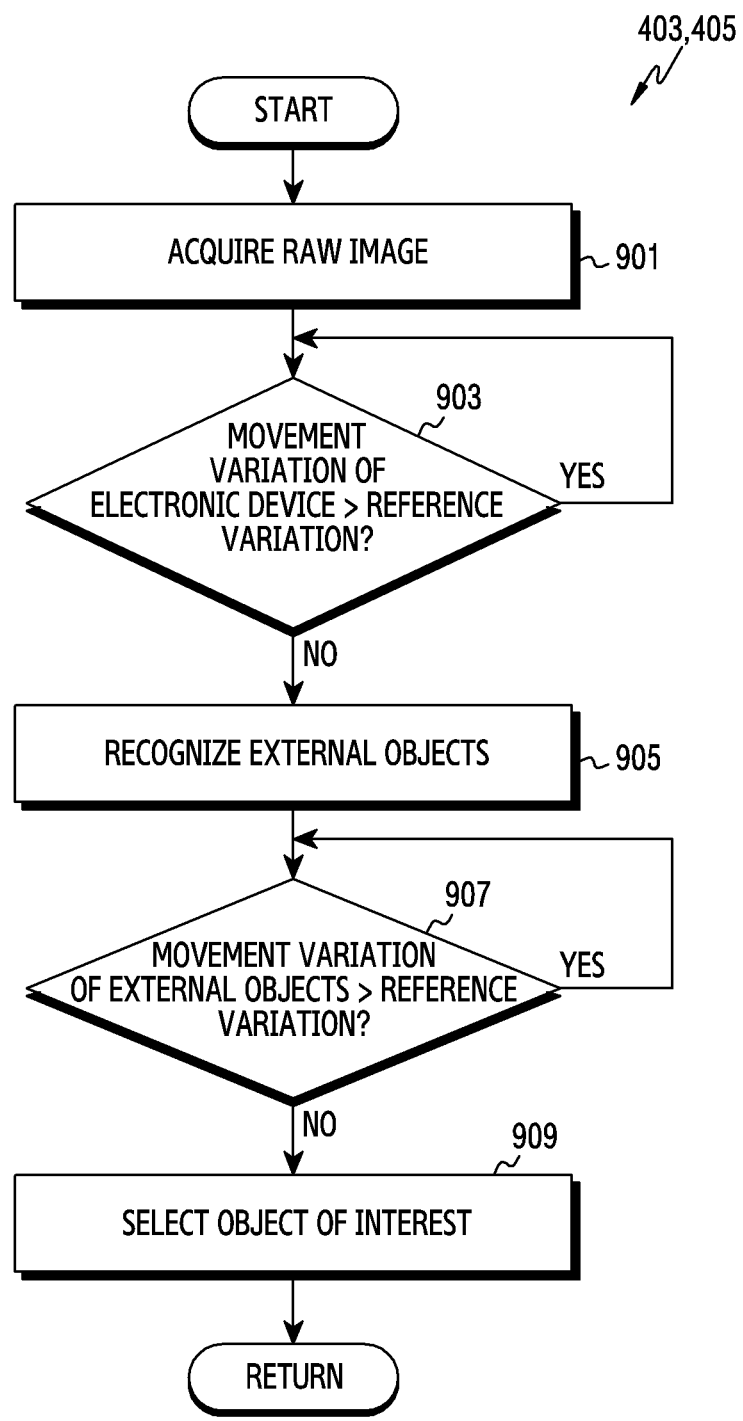
FIG. 9 is a flowchart for selecting an object of interest in an electronic device, according to an embodiment.
Figure 10:
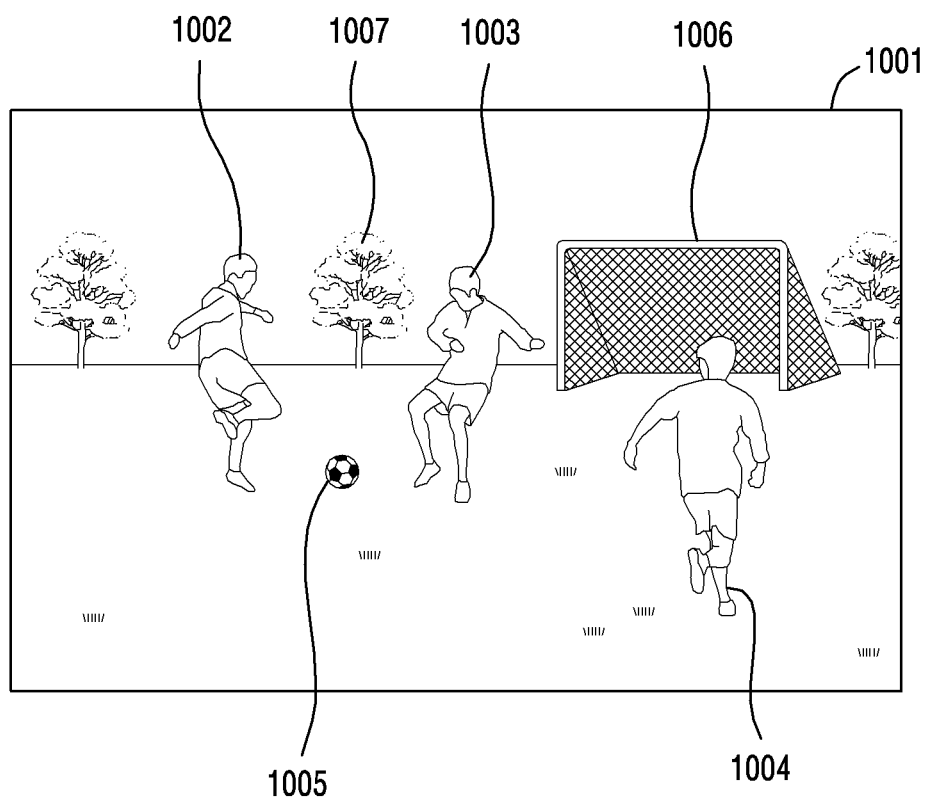
FIG. 10 is a diagram for selecting an object of interest in an electronic device, according to an embodiment.

FIG. 9 corresponds to operations 403 and 405 of FIG. 4 and is a flowchart for selecting an object of interest in an electronic device, according to an embodiment. FIG. 10 is a diagram for selecting an object of interest in an electronic device, according to an embodiment. The electronic device may include the electronic device 101 of FIG. 1, the electronic device 301 of FIG. 3, the electronic device 601 of FIG. 6, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, or the external electronic device 602 of FIG. 6. Hereinafter, operations steps 403 and 405 of FIG. 4 will be described in detail.

Referring to FIG. 9 and FIG. 10, in operation 901, the electronic device 601 acquires a raw image 1001. The acquired raw image may be an image acquired by the camera module 180 of FIG. 1 or an image acquired during a preview.

In operation 903, the electronic device 601 determines whether a movement variation of the electronic device 601 exceeds a reference variation. For example, in response to the acquiring of the raw image 1001 in a preview operation, the processor 120 may detect a movement of the electronic device 601 via a sensor module or detect a difference between a plurality of raw images acquired in the preview operation or a level of a blurred image, and may compare the detected movement variation and the reference variation. Herein, the reference variation may be a situation in which a movement of the electronic device is significant and thus it is difficult to acquire an image which is in focus.

If the movement variation of the electronic device exceeds the reference variation, the electronic device 601 may monitor the movement variation of the electronic device until the movement variation of the electronic device becomes less than the reference variation. For example, when a change of the movement of the electronic device 601 is significant and thus it is difficult to focus the raw image 1001, the processor 120 may monitor the variation of the movement of the electronic device without having to perform a procedure of recognizing external objects. The electronic device 601 may perform operation 905 upon detecting that the movement variation of the electronic device becomes less than the reference variation during the monitoring.

On the other hand, if the movement variation of the electronic device is less than the reference variation, proceeding to operation 905, the electronic device 601 recognizes external objects. For example, the processor 120 may recognize a first person object 1002, a second person object 1003, a third person object 1004, a soccer ball object 1005, a goalpost object 1006, and a tree object 1007 from the acquired raw image 1001.

In operation 907, the electronic device 601 determines whether a movement variation of external objects exceeds a reference variation. For example, the processor 120 may determine whether there is an object of which a movement variation exceeds the reference variation among objects 1002 to 1007 recognized from the raw image 1001.

If the movement variation of the external objects exceeds the reference variation, the electronic device 601 may monitor the movement variation of the external objects until the movement variation of the external objects becomes less than the reference variation. For example, the processor 120 may determine that a movement variation of the first person object 1002, the second person object 1003, or the third person object 1004 among the recognized objects 1002 to 1007 exceeds the reference variation, and may monitor the movement variation of the external objects until the movement variation of the external objects becomes less than the reference variation without having to select an object of interest to avoid a delay of an image processing time of the objects 1002 to 1004, each of which exceed the reference variation. The electronic device 601 may periodically monitor the movement variation of the objects 1002 to 1007, and may perform a procedure of selecting an object of interest if the movement variation of the external objects becomes less than the reference variation.

Otherwise, if the movement variation of the external objects does not exceed the reference variation, proceeding to operation 909, the electronic device 601 may select the object of interest. For example, the processor 120 may select an external object (e.g., the second person object 1003) of which a movement level is less than or equal to a threshold among a plurality of images stored through the electronic device 601 as the object of interest. After operation 909, returning to the previous procedure in FIG. 4, the electronic device 601 may perform operations 407 to 409.

Figure 11:
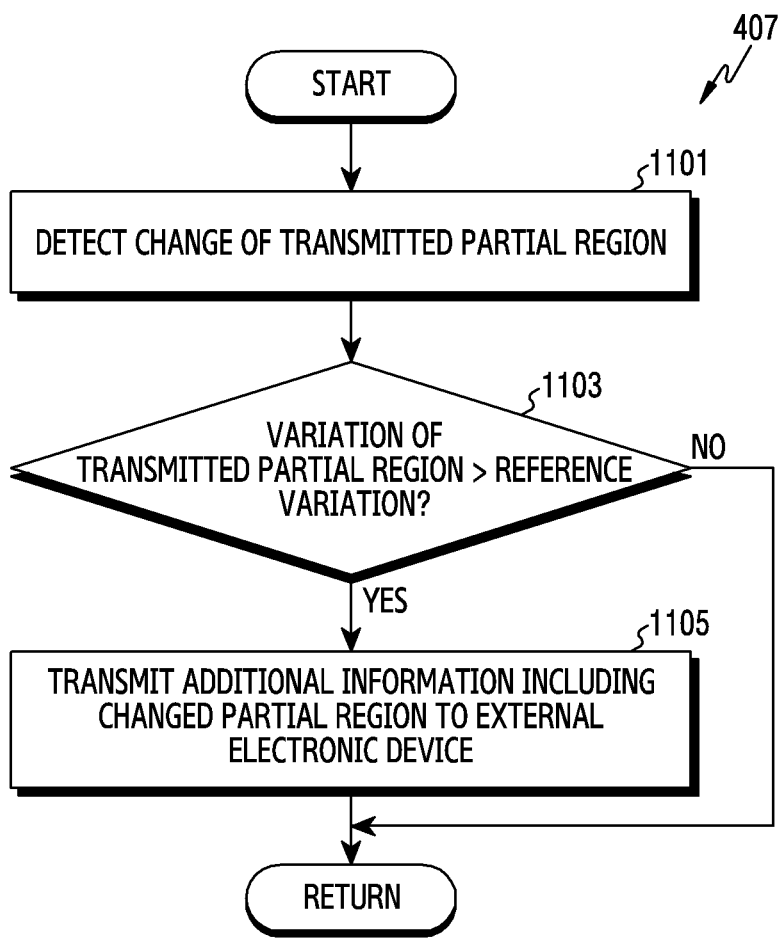
FIG. 11 is a flowchart for transmitting additional information in an electronic device, according to an embodiment.

FIG. 11 is a flowchart for transmitting additional information in an electronic device, according to an embodiment. FIG. 12 is a flowchart for transmitting data corresponding to a user level in an electronic device, according to an embodiment. The electronic device may include the electronic device 101 of FIG. 1, the electronic device 301 of FIG. 3, the electronic device 601 of FIG. 6, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, or the external electronic device 602 of FIG. 6. Hereinafter, operations step 407 of FIG. 4 will be described with reference to FIG. 11 and FIG. 12 in detail.

Referring to FIG. 11, in operation 1101, the electronic device 601 detects a change of a transmitted partial region. The change of the partial region may include a change of a direction, location, illumination, or posture of an object of interest corresponding to the partial region. An event for changing the partial region may include an event by which a face of a person facing to the left is changed to face to the right. In addition, the change of the partial region may include adding, deleting, or changing the object of interest corresponding to the partial region.

In operation 1103, the electronic device 601 determines whether a variation of the transmitted partial region exceeds a reference variation. For example, the processor 120 may determine that an operation of drawing a virtual image is additionally required due to a change in a direction in which the face of the person corresponding to the object of interest is viewed. In addition, the processor 120 may determine that the virtual image drawing operation is additionally required since a different object is added in the transmitted partial region. In addition, the processor 120 may determine that the virtual image drawing operation is not required due to a disappearance of an object included in the transmitted partial region. For example, the processor 120 may determine whether the direction of the object of interest is changed by more than a reference angle.

If the variation of the transmitted partial region does not exceed a reference variation, returning to the previous procedure, the electronic device 601 performs operations 407 to 409 of FIG. 4.

Alternatively, if the variation of the transmitted partial region exceeds the reference variation, proceeding to operation 1105, the electronic device 601 transmits additional information including a changed partial region to the external electronic device 602. For example, in a situation where information of a partial region in which a gaze of a person corresponding to an object of interest faces to the right is transmitted in advance, the processor 120 may detect that the gaze of the person corresponding to the object of interest faces to the left, and may determine that a variation of the gaze of the person which is the object of interest exceeds the reference variation. Therefore, the processor 120 may determine that there is a change in part of the object of interest of which image quality is to be improved, and may transmit additional information including change information of a partial region corresponding to the object of interest to the external electronic device 602. The external electronic device 602 may generate image processing information for improving image quality of a corresponding partial region based on the additional information. Thereafter, returning to the previous procedure, the electronic device 601 may repeatedly perform operations 407 to 409 of FIG. 4.

Figure 12:
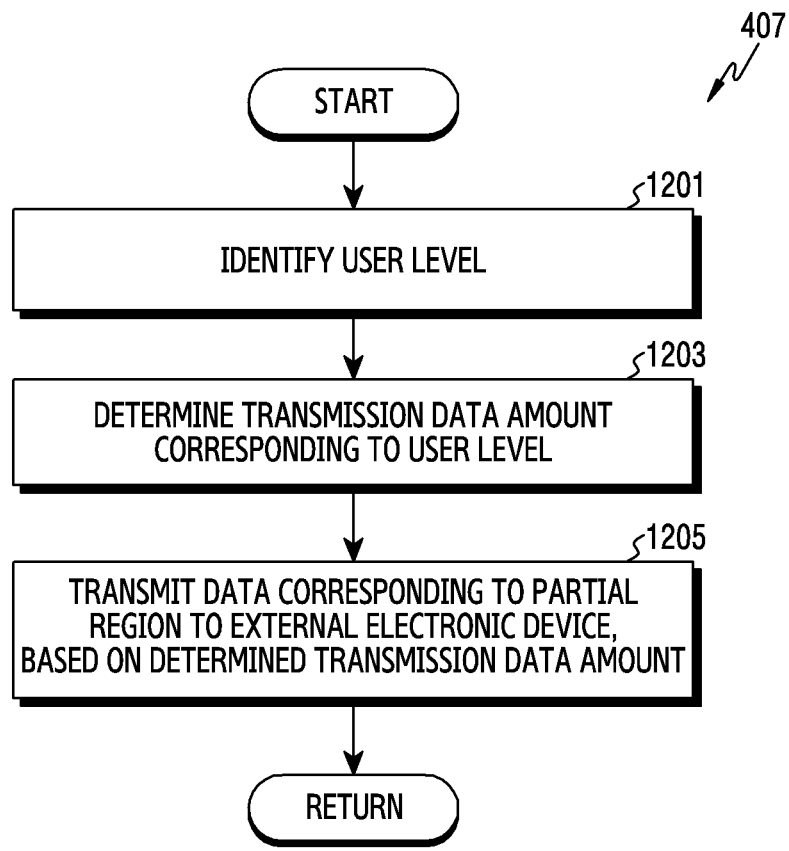
FIG. 12 is a flowchart for transmitting data corresponding to a user level in an electronic device, according to an embodiment.

Referring to FIG. 12, in operation 1201, the electronic device 601 identifies a level of a user. For example, an image quality improvement service provided by the external electronic device 602 may include a free service and a paid service, and the processor 120 may identify whether the user of the electronic device 601 uses the paid service or the free service.

In operation 1203, the electronic device 601 determines a transmission data amount corresponding to the user level. For example, if the user is a paying user, the processor 120 may increase the transmission data amount. Alternatively, if the user is a free user, the processor 120 may decrease the transmission data amount.

In operation 1205, the electronic device 601 transmits data corresponding to a partial region to the external electronic device 601 based on the determined transmission data amount. For example, if the user is the paying user, the processor 120 may transmit data corresponding to a partial region to the external electronic device 601 via the communication module 190 of FIG. 1 based on the increased transmission data amount. Alternatively, if the user is the free user, the processor 120 may transmit the data corresponding to the partial region to the external electronic device 601 via the data communication module 190 based on the decreased transmission data amount.

The external electronic device 602 may determine an image processing order and data transmission speed according to the level of the user. For example, the external electronic device 602 may preferentially process image data transmitted by the paying user.

Figure 13:
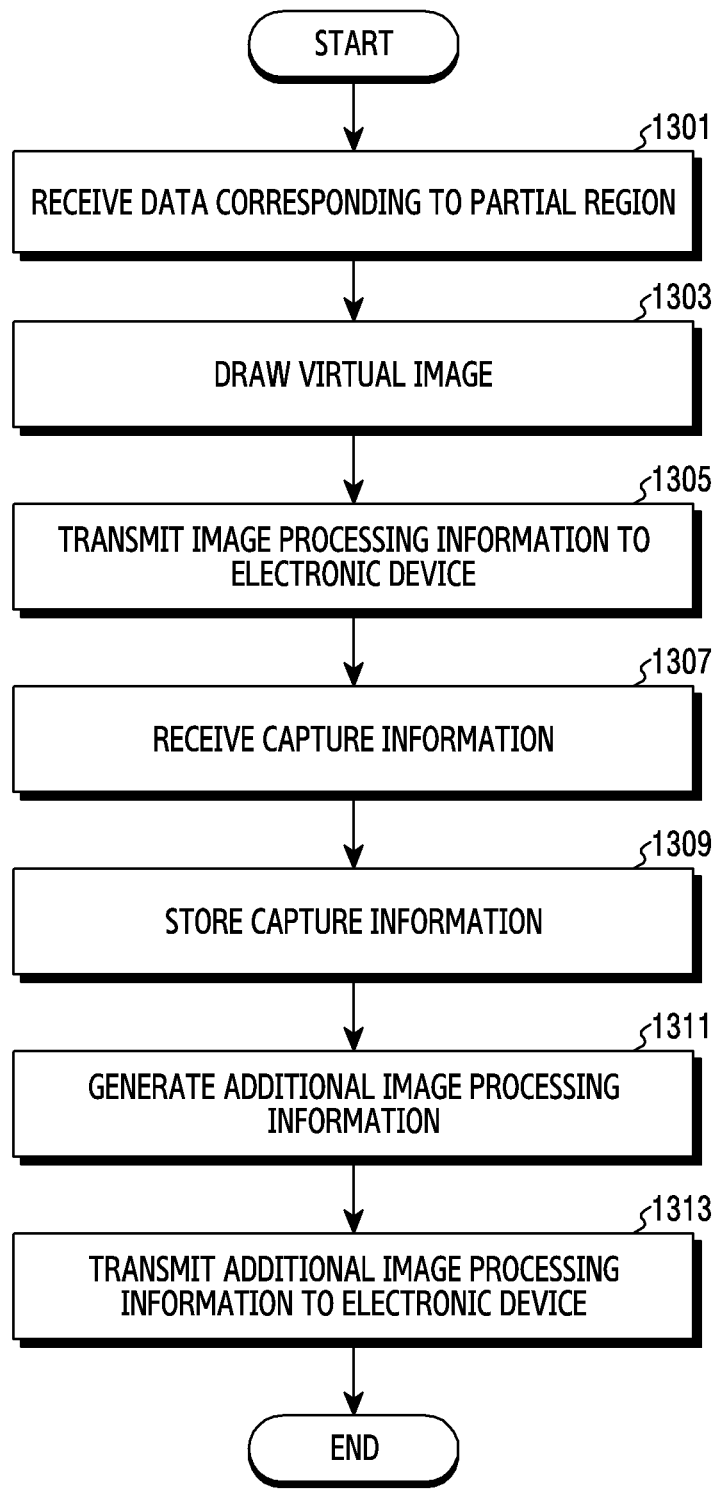
FIG. 13 is a flowchart of an operation of an external electronic device, according to an embodiment.

FIG. 13 is a flowchart of an operation of an external electronic device, according to an embodiment. The electronic device may include the electronic device 101 of FIG. 1, the electronic device 301 of FIG. 3, the electronic device 601 of FIG. 6, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, or the external electronic device 602 of FIG. 6.

Referring to FIG. 13, in operation 1301, the external electronic device 602 receives data corresponding to at least a partial region from the electronic device 601.

In operation 1303, the external electronic device 602 draws a virtual image based on the data corresponding to at least the partial region. For example, the external electronic device 602 may draw the virtual image to generate image processing information capable of improving image quality of the partial region.

In operation 1305, the external electronic device 602 transmits the image processing information to the electronic device 601. The image processing information may include a drawn virtual image.

According to an embodiment, the external electronic device 602 may repeatedly perform operations 1301 to 1305. For example, the external electronic device 602 may sequentially perform operations 1303 and 1305 for a corresponding partial region according to an order of receiving data corresponding to a plurality of partial regions.

The external electronic device 602 receives capture information from the electronic device 601 in operation 1307, and stores the capture information in operation 1309. The external electronic device 602 may acquire at least part of a captured raw image by storing the capture information.

In operation 1311, the external electronic device 602 generates additional image processing information. For example, the external electronic device 602 may generate the additional image processing information for a different partial region corresponding to a low priority, and thereafter generate additional image processing information on a partial region corresponding to a very next priority. For example, the external electronic device 602 may sequentially generate additional image processing information corresponding to a plurality of partial regions based on the priority. Additionally, if it is determined that additional image quality improvement of the raw image is unnecessary, the external electronic device 602 may not generate the additional image processing information.

In operation 1313, the external electronic device 602 transmits the additional image processing information to the electronic device 601. For example, the external electronic device 602 may sequentially or concurrently transmit to the electronic device 601 a plurality of pieces of additional image processing information sequentially generated based on the priority, according to an order of generating the information.

An operation of correcting a raw image, performed by an external electronic device, will be described with reference to FIG. 14 to FIG. 16.

Figure 14:
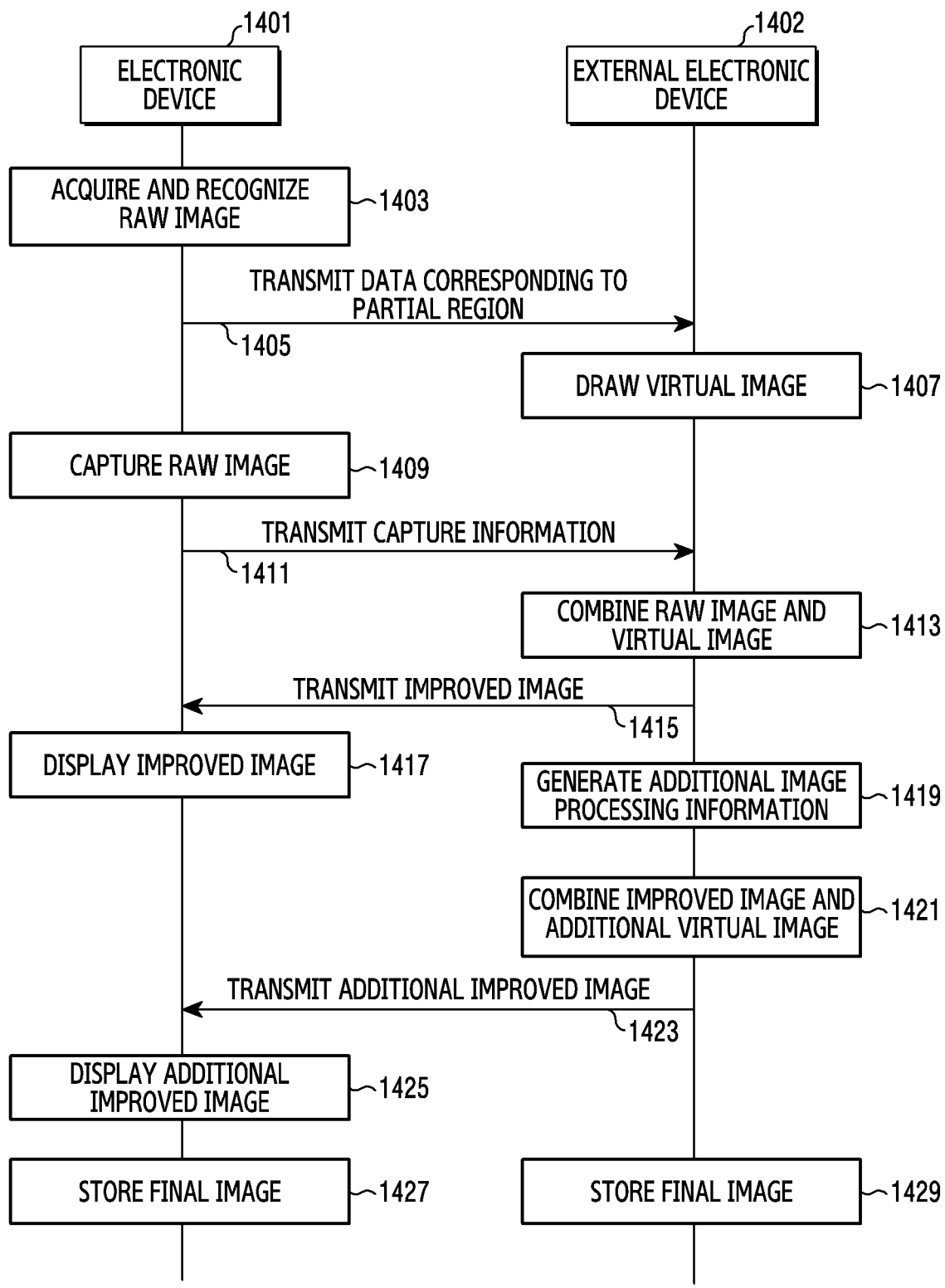
FIG. 14 is a flowchart of an operation of an electronic device and an external electronic device, according to an embodiment.

FIG. 14 is a flowchart of an operation of an electronic device and an external electronic device, according to an embodiment of the present disclosure. The electronic device may include the electronic device 101 of FIG. 1, the electronic device 301 of FIG. 3, the electronic device 601 of FIG. 6, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, or the external electronic device 602 of FIG. 6.

Referring to FIG. 14, an electronic device 1401 acquires and recognizes a raw image during a preview in operation 1403, and transmits data corresponding to at least a partial region of the raw image to an external electronic device 1402 according to a priority in operation 1405. In operation 1407, the external electronic device 1402 draws a virtual image based on data corresponding to the partial region. The electronic device 1401 captures the raw image in operation 1409, and transmits capture information to the external electronic device 1402 in operation 1411 upon capturing the raw image. Since operation 1403 to 1411 are the same as or similar to operation 603 to 613 in FIG. 6, the same description will be omitted to avoid redundancy.

According to an embodiment, unlike in the operation of FIG. 6, the external electronic device 1402 may not transmit the image processing information to the electronic device 1401. In addition, unlike in the operation of FIG. 6, the external electronic device 1402 may not generate the image processing information.

In operation 1413, the external electronic device 1402 combines the raw image and the virtual image. For example, the external electronic device 1402 may sequentially or concurrently combine the raw image and the plurality of virtual images generated sequentially. That is, operation 1413 may be repeatedly performed according to the number of pieces of data corresponding to partial regions.

In operation 1415, the external electronic device 1402 transmits to the electronic device 1401 an improved image generated by combining the raw image and the virtual image.

The electronic device 1401 displays the improved image in operation 1417, and the external electronic device 1402 generates additional image processing information in operation 1419. For example, the external electronic device 1402 may generate additional image processing information for correcting a partial region corresponding to a low priority, and may generate additional image processing information for correcting a partial region corresponding to a very next priority. That is, the external electronic device 1402 may sequentially generate a plurality of pieces of additional image processing information for correcting a plurality of partial regions based on the priority.

The external electronic device 1402 combines the improved image and the additional virtual image in operation 1421, and transmits an additional improved image to the electronic device 1401 in operation 1423. After transmitting an additional improved image of which a partial region corresponding to a low priority is corrected, the external electronic device 1402 may transmit an additional improved image of which a partial region corresponding to a very next priority is corrected. That is, the external electronic device 1402 may sequentially transmit a plurality of additional improved images to the electronic device 1401 based on the priority.

In operation 1425, the electronic device 1401 displays the additional improved image. For example, after displaying an additional improved image of which a partial region corresponding to a low priority is corrected, the electronic device 1401 may display an additional improved image of which a partial region corresponding to a very next priority is corrected. An additional improved image to be displayed next may be an image acquired through accumulated corrections of additional improved images previously displayed. Therefore, among the additional improved images sequentially displayed, a last displayed additional improved image may be an image having the best (i.e., the most improved) image quality among the additional improved images.

In operation 1427, the electronic device 1401 stores a final image of which image quality improvement is complete, and in operation 1429 the external electronic device 1402 also stores the final image of which image quality improvement is complete. Upon determining that image quality improvement is required even after the final image is stored, the external electronic device 1402 may additionally correct a partial region included in the final image.

The image processing operation of the electronic device 1401 will be described below with reference to FIG. 15, and the image processing operation of the external electronic device 1402 will be described below with reference to FIG. 16.

Figure 15:
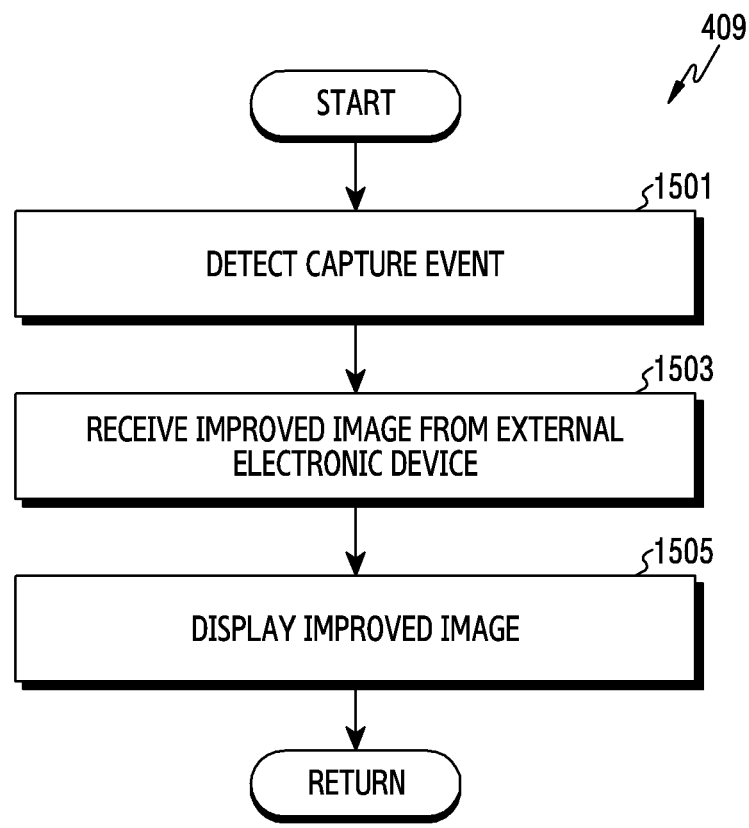
FIG. 15 is a flowchart of an operation of an electronic device, according to an embodiment.

FIG. 15 is a flowchart of an operation of an electronic device, according to an embodiment. The electronic device may include the electronic device 101 of FIG. 1, the electronic device 301 of FIG. 3, the electronic device 601 of FIG. 6, the electronic device 1401 of FIG. 14, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, the external electronic device 602 of FIG. 6, or the external electronic device 1402 of FIG. 14. Hereinafter, operations Step 409 of FIG. 4 will be described in detail with reference to FIG. 15. When operations of the electronic device of FIG. 15 are the same as operations of the electronic device of FIG. 4, descriptions thereof will be omitted to avoid redundancy.

The electronic device 1401 may acquire a raw image including one or more external objects during a preview, recognize one or more external objects by using the raw image, select at least one object of interest among the one or more external objects, determine a priority for at least a partial region among a plurality of regions based on the at least one object of interest among the one or more external objects, and transmit data corresponding to at least the partial region to the external electronic device 1402 according to a priority so that the external electronic device 1402 generates image processing information on at least the partial region.

Referring to FIG. 15, in operation 1501, the electronic device 1401 detects a capture event. Since operation 1501 is the same as or similar to operation 701 of FIG. 7, descriptions thereof will be omitted to avoid redundancy.

In operation 1503, the electronic device 1401 receives an improved image from the external electronic device 1402. For example, the processor 120 may sequentially receive a plurality of improved images from the external electronic device 1402 via the communication module 190 of FIG. 1, or may receive one improved image.

In operation 1505, the electronic device 1401 displays the improved image upon receiving the improved image. For example, the processor 120 may sequentially display the improved image according to an order of receiving a plurality of improved images.

The electronic device 1401 may display the improved image on the display by detecting a user input from an image application.

After the capture event, the electronic device 1401 may receive an additional improved image of which a partial region corresponding to a low priority is corrected among a plurality of regions from the external electronic device 1402 to display the additional improved image, and may receive an additional improved image of which a partial region corresponding to a very next priority is corrected from the external electronic device 1402 to display the additional improved image. That is, the electronic device 1401 may sequentially display the additional improved images based on the priority.

Operations of the external electronic device 1402 will be described below with reference to FIG. 16.

Figure 16:
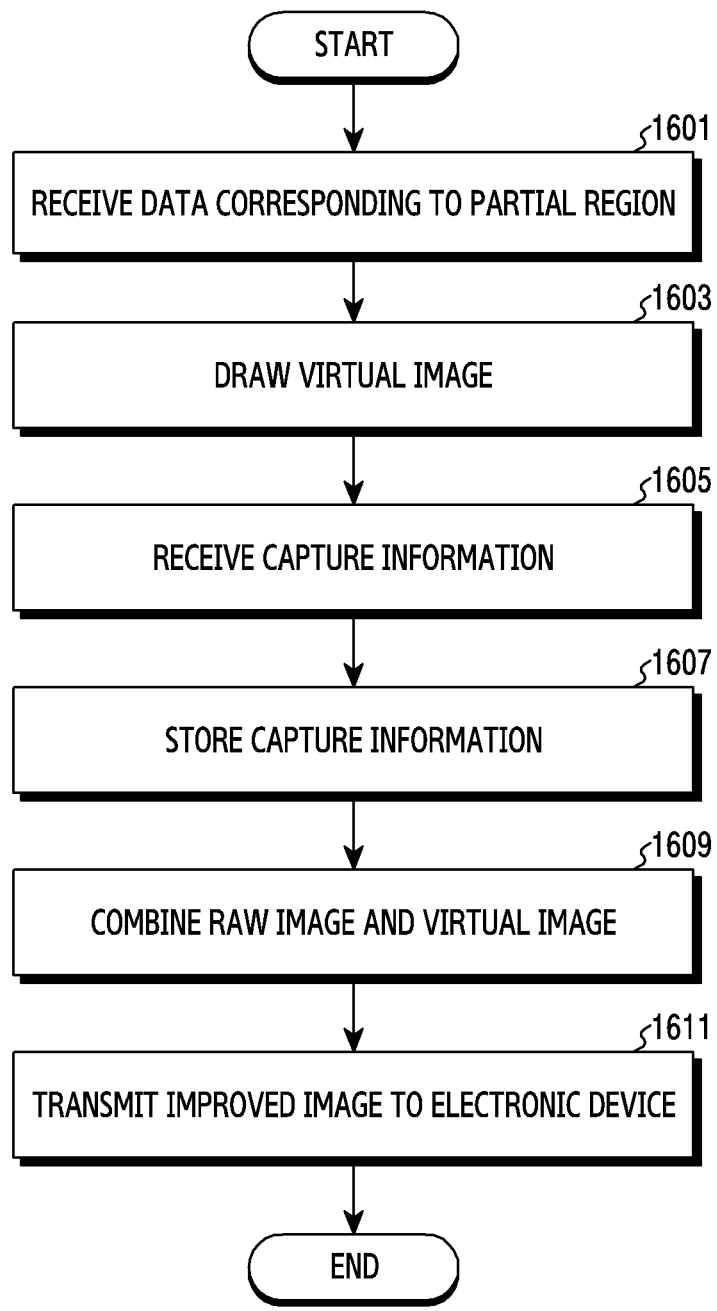
FIG. 16 is a flowchart of an operation of an external electronic device, according to an embodiment.

FIG. 16 is a flowchart of an operation of an external electronic device, according to an embodiment. The electronic device may include the electronic device 101 of FIG. 1, the electronic device 301 of FIG. 3, the electronic device 601 of FIG. 6, the electronic device 1401 of FIG. 14, or at least part (e.g., the processor 120) of the electronic device 101. In addition, in the following description, the external electronic device may include the electronic device 102 of FIG. 1, the electronic device 104 of FIG. 1, the server 108 of FIG. 1, the external electronic device 201 of FIG. 2, the external electronic device 302 of FIG. 3, the external electronic device 602 of FIG. 6, or the external electronic device 1402 of FIG. 14.

Referring to FIG. 16, the external electronic device 1402 receives data corresponding to at least a partial region from the electronic device 1401 in operation 1601, and draws a virtual image based on the data corresponding to at least the partial region in operation 1603. Since operations 1601 and 1603 are the same as or similar to operations 1301 and 1303 of FIG. 13, the same description will be omitted to avoid redundancy.

The external electronic device 1402 receives capture information from the electronic device 1401 in operation 1605, and stores the capture information in operation 1607. Since operations 1605 and 1607 are the same as or similar to operations 1307 and 1309 of FIG. 13, the same description will be omitted to avoid redundancy.

The external electronic device 1402 combines the raw image and the virtual image in operation 1609. For example, the processor 120 may sequentially or concurrently combine the captured raw image and a plurality of pre-drawn virtual images.

In operation 1611, the external electronic device 1402 transmits an improved image to the electronic device 1401. For example, the processor 120 may sequentially transmit to the electronic device 1401 improved images which are generated by sequentially combining the raw image and the plurality of virtual images. Alternatively, the external electronic device 1402 may transmit to the electronic device 1401 the improved images generated by concurrently combining the raw image and the plurality of virtual images.

The external electronic device 1402 may transmit to the electronic device 1401 an additional improved image of which a partial region corresponding to a low priority is corrected, and may transmit to the electronic device 1401 an additional improved image of which a partial region corresponding to a very next priority is corrected. That is, the external electronic device 1402 may sequentially transmit a plurality of additional improved images to the electronic device 1401 based on the priority.

According to an embodiment, a method of operating an electronic device may include acquiring a raw image for one or more external objects by using the camera, recognizing the one or more external objects by using the raw image, segmenting the raw image into a plurality of regions corresponding to the one or more external objects, determining a priority for at least a partial region among the plurality of regions based on at least one object of interest among the one or more external objects, transmitting data corresponding to at least the partial region to an external electronic device according to the priority so that the external electronic device generates image processing information for at least the partial region, and displaying the raw image of which at least the partial region is sequentially corrected according to the priority, by using the image processing information.

According to an embodiment, the method may further include receiving additional image processing information corresponding to a different partial region among the plurality of regions while displaying the raw image, correcting the different partial region of the raw image by using the additional image processing information, and displaying the raw image of which the different partial region is corrected.

According to an embodiment, the method may further include determining a transmission order of data corresponding to at least the partial region based on a communication environment with the external electronic device.

According to an embodiment, the method may further include receiving the corrected raw image generated by the external electronic device by using the image processing information via the communication module.

According to an embodiment, the method may further include sequentially correcting at least the partial region according to the priority by using the image processing information.

According to an embodiment, the method may further include selecting the object of interest based on at least one of a speed detected from the raw image among the one or more external objects, a capture frequency of the one or more external objects, a movement of the one or more external objects, a size of the one or more external objects, a user preference of the one or more external objects, an image processing time of the one or more external objects, and additional objects subjected to focus adjustment among the one or more external objects.

According to an embodiment, the method may further include determining whether a movement variation of the electronic device is less than a reference variation of the electronic device, recognizing the external objects if the movement variation of the electronic device is less than the reference variation, determining whether the movement variation of the external objects is less than the reference variation based on the recognized external objects, and selecting the object of interest if the movement variation of the external objects is less than the reference variation.

According to an embodiment, the data corresponding to at least the partial region may be transmitted to the external electronic device according to the priority so that the external electronic device generates the image processing information for at least the partial region before the raw image is captured.

According to an embodiment, the method may further include receiving the corrected raw image generated by the external electronic device by using the image processing information after the raw image is captured.

According to an embodiment, the method may further include sequentially correcting at least the partial region according to the priority by using the image processing information after the raw image is captured.

Thus, according to various embodiments, an electronic device and an operating method thereof can increase a transmission speed between an electronic device and a cloud server by preferentially transmitting one or more parts of objects included in an image.

Further, according to various embodiments, an external electronic device and an operating method thereof may increase an image processing speed by generating a virtual image required to improve image quality before an image is captured.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents

What is claimed is:

1. An electronic device comprising:
a camera;
a communication module;
a display; and
a processor configured to:
acquire a raw image for one or more external objects by using the camera;
recognize the one or more external objects by segmenting the raw image into a plurality of regions corresponding to the one or more external objects;
determine a priority for a partial region among the plurality of regions based on at least one object of interest among the one or more external objects;
transmit data corresponding to the partial region to an external electronic device according to the priority so that the external electronic device generates image processing information for the partial region; and
display the raw image, of which the partial region is sequentially corrected according to the priority, via the display by using the image processing information.

2. The electronic device of claim 1, wherein the processor is further configured to:
receive additional image processing information corresponding to a different partial region of the raw image among the plurality of regions while displaying the raw image;
correct the different partial region of the raw image by using the additional image processing information; and
display the raw image, of which the different partial region is corrected.

3. The electronic device of claim 1, wherein the processor is further configured to determine a transmission order of data corresponding to the partial region based on a communication environment with the external electronic device.

4. The electronic device of claim 1, wherein the processor is further configured to receive the corrected raw image generated by the external electronic device by using the image processing information via the communication module.

5. The electronic device of claim 1, wherein the processor is further configured to sequentially correct the partial region according to the priority by using the image processing information.

6. The electronic device of claim 1, wherein the processor is further configured to select the at least one object of interest based on at least one of a speed detected from the raw image among the one or more external objects, a capture frequency of the one or more external objects, a movement of the one or more external objects, a size of the one or more external objects, a user preference of the one or more external objects, an image processing time of the one or more external objects, and additional objects subjected to focus adjustment among the one or more external objects.

7. The electronic device of claim 1, wherein the processor is further configured to:
determine whether a movement variation of the electronic device is less than a reference variation of the electronic device;
recognize the one or more external objects if the movement variation of the electronic device is less than the reference variation;
determine whether the movement variation of the one or more external objects is less than the reference variation based on the recognized one or more external objects; and
select the object of interest if the movement variation of the one or more external objects is less than the reference variation.

8. The electronic device of claim 7, wherein the processor is further configured to transmit the data corresponding to the partial region to the external electronic device according to the priority so that the external electronic device generates the image processing information for the partial region before the raw image is captured.

9. The electronic device of claim 8, wherein the processor is further configured to receive the corrected raw image generated by the external electronic device by using the image processing information via the communication module after the raw image is captured.

10. The electronic device of claim 8, wherein the processor is further configured to sequentially correct the partial region according to the priority by using the image processing information after the raw image is captured.

11. A method of operating an electronic device, the method comprising:
acquiring a raw image for one or more external objects by using a camera;
recognizing the one or more external objects by using the raw image;
segmenting the raw image into a plurality of regions corresponding to the one or more external objects;
determining a priority for at least a partial region among the plurality of regions based on at least one object of interest among the one or more external objects;
transmitting data corresponding to the partial region to an external electronic device according to the priority so that the external electronic device generates image processing information for the partial region; and
displaying the raw image, of which the partial region is sequentially corrected according to the priority, by using the image processing information.

12. The method of claim 11, further comprising:
receiving additional image processing information corresponding to a different partial region among the plurality of regions while displaying the raw image;
correcting the different partial region of the raw image by using the additional image processing information; and
displaying the raw image, of which the different partial region is corrected.

13. The method of claim 11, further comprising determining a transmission order of data corresponding to the partial region based on a communication environment with the external electronic device.

14. The method of claim 11, further comprising receiving the corrected raw image generated by the external electronic device by using the image processing information via the communication module.

15. The method of claim 11, further comprising sequentially correcting the partial region according to the priority by using the image processing information.

16. The method of claim 11, further comprising selecting the at least one object of interest based on at least one of a speed detected from the raw image among the one or more external objects, a capture frequency of the one or more external objects, a movement of the one or more external objects, a size of the one or more external objects, a user preference of the one or more external objects, an image processing time of the one or more external objects, and additional objects subjected to focus adjustment among the one or more external objects.

17. The method of claim 11, further comprising:
determining whether a movement variation of the electronic device is less than a reference variation of the electronic device;
recognizing the one or more external objects if the movement variation of the electronic device is less than the reference variation;
determining whether the movement variation of the one or more external objects is less than the reference variation based on the recognized one or more external objects; and
selecting the object of interest if the movement variation of the one or more external objects is less than the reference variation.

18. The method of claim 17, wherein the data corresponding to the partial region is transmitted to the external electronic device according to the priority so that the external electronic device generates the image processing information for the partial region before the raw image is captured.

19. The method of claim 18, further comprising receiving the corrected raw image generated by the external electronic device by using the image processing information after the raw image is captured.

20. The method of claim 18, further comprising sequentially correcting the partial region according to the priority by using the image processing information after the raw image is captured.

* * * * *